United States Patent
Holz et al.

(10) Patent No.: US 12,380,812 B2
(45) Date of Patent: Aug. 5, 2025

(54) METHOD FOR REPRODUCIBLE PRODUCTION OF DEFINED BONE FRACTURES

(71) Applicant: RIMASYS GMBH, Cologne (DE)

(72) Inventors: Robert Holz, Cologne (DE); Marc Ebinger, Cologne (DE)

(73) Assignee: RIMASYS GMBH, Cologne (DE)

( * ) Notice: Subject to any disclaimer, the term of this patent is extended or adjusted under 35 U.S.C. 154(b) by 1061 days.

(21) Appl. No.: 16/321,320

(22) PCT Filed: Jul. 29, 2016

(86) PCT No.: PCT/EP2016/068217
§ 371 (c)(1),
(2) Date: Jan. 28, 2019

(87) PCT Pub. No.: WO2018/019390
PCT Pub. Date: Feb. 1, 2018

(65) Prior Publication Data
US 2021/0012681 A1 Jan. 14, 2021

(51) Int. Cl.
*G09B 23/30* (2006.01)
(52) U.S. Cl.
CPC ............................. *G09B 23/306* (2013.01)
(58) Field of Classification Search
None
See application file for complete search history.

(56) References Cited

U.S. PATENT DOCUMENTS

2014/0057236 A1  2/2014  Meglan et al.

FOREIGN PATENT DOCUMENTS

EP  1284711 B1  1/2005

OTHER PUBLICATIONS

"Design and Evaluation of a Novel Simulator for High-speed Injuries of the Human Forearm," M. Ebinger, Jan. 28, 2013, pp. 1-67 (Year: 2013).*
"Sequence of the Essex-Lopresti lesion—A High Speed Video Documentation and Kinematic Analysis," Wegmann et al. Acta Orthopaedica, 85:2, Jan. 30, 2014, pp. 177-180 (Year: 2014).*
"The Mechanism of Essex-Lopresti: Investigation of Tissue Failure Using a Newly Developed Simulator," Holz, Koln, German Sport University, Master's thesis, 2012, pp. 1-148 (Year: 2012).*

(Continued)

*Primary Examiner* — James B Hull
(74) *Attorney, Agent, or Firm* — Jeff B. Vockrodt; CM Law

(57) ABSTRACT

The subject matter of the invention relates to a method of reproducible production of defined bone fractures with accompanying soft tissue injuries in specimens, in particular in human specimens, apparatuses for applying the method and the specimens, in particular human specimens, produced with the aid of the method and characterized by a defined bone fracture with accompanying soft tissue injuries. The specimens produced with the method according to the invention, in particular human specimens, can be used in the schooling, teaching and development of medical staff, for the development and validation of medical instruments, implants and prostheses, for the analysis of accidents and for expert opinions.

6 Claims, 7 Drawing Sheets

(56) References Cited

OTHER PUBLICATIONS

Figure 1:
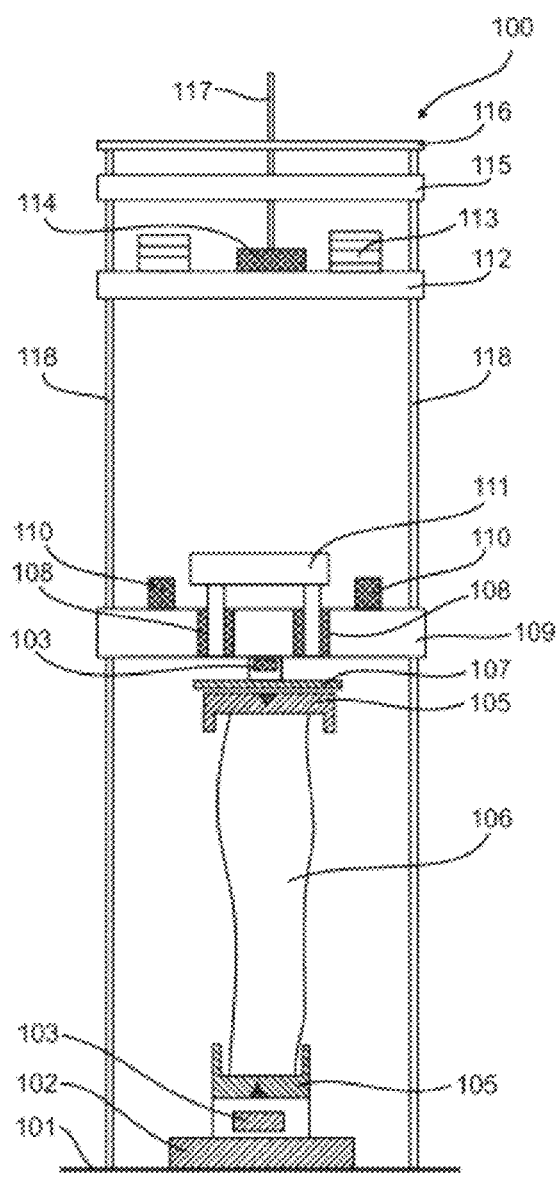

International Search Report as cited in International Application No. PCT/EP2016/068217 dated Jan. 12, 2016.
Wegmann, K., et al., "Sequence of the Essex-Lopresti lesion—a high-speed video documentation and kinematic analysis", Acta Orthopaedica, Apr. 20, 2014; vol. 85, No. 2, pp. 177-180.
Wegmann et al., "Sequence of the Essex-Lopresti Lesion—a high-speed video documentation and kinematic analysis," Acta Orthopaedica, vol. 85, No. 2, 2014, pp. 177-180.
McGinley et al., "Forearm and Elbow Injury: The Influence of Rotational Position," The Journal of Bone and Joint Surgery, vol. 85-A, No. 12, Dec. 2003, pp. 2403-2409.
Henderson et al., "Biomechanical Response of the Lower Leg under High Rate Loading," IRCOBI Conference, 2013, IRC-13-24, pp. 145-157.
Ebinger, Marc, Design and Evaluation of a Novel Simulator for High-speed Injuries of the Human Forearm: Jan. 28, 2013, Cologne, Germany, 67 pages.
Fink, Dieter, "Konzeption und Erstellung eines Softwarepakets zur Synchronisation Datenerfassung und Messsignaldarstellung zum Simulator der Essex Lopresti," 2012, Cologne, Germany, 47 pages (English-Abstract provided).
Holz, Robert, Feb. 2013, pp. 1-74 (English-Abstract provided).
Thiele, Kathi, Monteggia- und Monteggia-like-Verletzungen, Mar. 2018, Obere Extremität, 2 pages (English-Abstract provided).
Ebinger, "Design and evaluation of a novel simulator for high-speed injuries of the human forearm," Deutsche Sporthochschul Koeln, Institute of Biomechanics and Orthopaedics, Master Thesis, Jan. 28, 2013, 67 pages.
Ellenbogenverletzungen, Feb. 14-15, 2014, medartis, precision in fixation, with translation, 4 pages.
Fink, "Konzeption und Erstellung eines Softwareakets zur Synchornisation, Datenerfassung und Messsignaldarstellung zum Simulator der Essex Lopresti," Deutsche Sporthochschule Koeln, Institut fuer Biomechanik und Othopaedie, Koeln 2012, abstract translation only, 48 pages.
Henderson et al., "Biomechanical Response of the Lower Leg under High Rate Loading," IRC-13-24, IRCOBI conference 2013, [no date], 13 pages.
Holz, "The Mechanism of Essex Lorpresti: investigation of tissue failure using a newly developed simulator," Koln, 2012, v/73 pp.—Koln, German Sport University, Master's thesis, 2012, with translation, 148 pages.
International Bone Research Association, Program, BRA Master Training Course, realistic Treatment of elbow injuries, Apr. 17-18, 2015, with translation, 24 pages.
McGinley, et al., "Forearm and Elbow Injury: The Influence of Rotational Position," The Journal of Bone and Joint Surgery, Incorporated, vol. 85-A, No. 12, Dec. 2003, 7 pages.
Office Action received in Australian Application No. 2016416631 dated May 28, 2022, 3 pages.
Office Action received in European Application No. 16 753 848.7-1218 dated Apr. 25, 2022, with translation, 9 pages.
Office Action received in European Application No. 16 753 848.7-1222 dated May 18, 2020, with translation, 28 pages.
Office Action received in European Application No. 16 753 848.7-1222 dated May 25, 2021, with translation, 9 pages.
Office Action received in European Application No. 16 753 848.7-1222 dated Nov. 12, 2020, with translation, 8 pages.
Office Action received in German Application No. 11 2016 003 246.3 dated Mar. 26, 2021, with translation, 18 pages.
Office Action received in German Application No. 11 2016 003 246.3 dated Oct. 9, 2020, with translation, 26 pages.
Office Action received in German Application No. 11 2016 003 246.3 dated Sep. 24, 2018, with translation, 19 pages.
Office Action received in German Application No. 11 2016 007 611.8 dated Aug. 12, 2022, with translation, 20 pages.
Office Action received in Switzerland Application No. MH/P44211CHPC, dated Jun. 8, 2018, with translation, 3 pages.
Shakeel Thomas Bhatti, [no date], with translation, 2 pages.
Wegmann et al., "Sequence of the Essex-Lopresti lesion—a high-speed video documentation and kinematic analysis," Acta Orthopaedica, Jan. 30, 2014, 18 pages.
Delye et al., "Biomechanics of Frontal Skull Fracture," Journal of Neurotrauma, Oct. 2007, 11 pages.
Fitzpatrick et al., "A New Fracture Model for "Terrible Triad" Injuries of the Elbow: Influence of Forearm Rotation on Injury Patterns," J. Orthop Trauma, vol. 0, No. 0, 2012 [no date], www.jorthotrauma.com, 6 pages.
Hawkins, "Fractures of the Neck of the Talus," The Journal of Bone & Joint Surgery, 52(5), Jul. 1970, 1 page.
Kassat, "Biomechanics for Non-Biomechanics," Fitness-Contour-Verl., Buende 1993, [no date], 1 page.
Marth, "Biomechanics of the Shoulder in Lateral Impact," Graduate School of Wayne State University, Doctor of Philosophy, 2002 [no date], 24 pages.
Masouros, et al., "Design of a Traumatic Injury Simulator for Assessing Lower Limb Response to High Loading Rates," Annals of Biomedical Engineering, Apr. 17, 2013, 11 pages.
Nyquist, "Certain Topics in Telegraph Transmission Theory," Proceedings of the IEEE, vol. 90, No. 2, Feb. 2002, 26 pages.
"Realistic treatment of elbow injuries," IBRA course program, Apr. 15-16, 2016, at the Department of Anatomy, 48 pages.
Communication pursuant to Article 94 (3) EPC, European Application No. 21192123.4-1218, Nov. 15, 2023, with translation, 10 pages.
Medartis GmbH (Umkirch) "Medartis Insight," veroeffentlicht zwischen, Sep. 2014 and Feb. 2015, with translation, 35 pages.
Notification of an objection, European Application No. 16753848.7-1218, Sep. 21, 2023, with translation, 123 pages.
Oetzi, "The invention of slapstick archaeology,", https://newsv2.ort.at/stories/2358147/235814, no date, with translation, 6 pages.
Presentation of the treatment results, IBRA course from Apr. 15-16, 2016 at the Anatomy Department of the University Hospital Cologne, with translation, 24 pages.
Shakeel Thomas Bhatti, Rechtsfolge, no date, with translation, 3 pages.
Communication received in European Application No. 16 753 848.7-1218 dated Nov. 24, 2022, with translation, 12 pages.
Communication received in European Application No. 16753848.7-1218 dated Mar. 15, 2023, with translation, 8 pages.
Communication received in European Application No. 16753848.7-1218 dated Oct. 21, 2022, with translation, 10 pages.
European Justification received in EP Application No. 16753848.7-1222 dated Aug. 7, 2020, 5 page.
European Third Party Objection received in EP Application No. 16753848.7-1222 dated Jan. 30, 2020, 17 pages.
Notice of Opposition against European Patent No. EP 3 491 635 B1 of Company Rimasys GmbH dated Feb. 1, 2024, with translation, 77 pages.
Search Report received in European Application No. 23200419.2-1218 dated Jan. 2, 2024, 8 pages.
IBRA Master Training Course, Realistic treatment of elbow injuries, Apr. 17-18, 2015 Anatomy of the University of Cologne (w/ English Text Translation).
McGinley et al., "Forearm interosseious membrane trauma: MRI diagnostic criteria and injury patterns," Skeletal Radiol (2006) 35: Feb. 22, 2006, 7 pages.
Affidavit of Jutta Knifka dated Jan. 17, 2025, with translation, 2 pages.
Affidavit of participation in the surgery courses dated Dec. 30, 2024, with translation, 6 pages.
Attachment to Summons to Oral Proceedings received in European Application No. 16 753 848.7 dated Feb. 19, 2025, with translation, 56 pages.
Decision on taking evidence received in European Application No. 16753848.7-1218 dated Feb. 19, 2025, with translation, 4 pages.
Hinweis z. mündl. Verhandlung received Jul. 24, 2025, 3 pages.
Intention to Grant received in German Application No. 11 2016 007 6118.8 dated Jan. 30, 2025, with translation, 16 pages.
Intention to Grant received in German Application No. 11 2016 007 648.7 dated Jan. 30, 2025, with translation, 14 pages.

(56) References Cited

OTHER PUBLICATIONS

International Bone Research Association, IBRA Master Training Course, Realistic Treatment of Wrist and Elbow Fractures, Jun. 11-13, 2015, 20 pages.
International Bone Research Association, IBRA Master Training Course, Realistic Treatment of Wrist Fractures, Apr. 24-25, 2015, 12 pages.
Notice of opposition received in European Application No. 3 937 157 B1 dated Jan. 23, 2025, with translation, 76 pages.
Notice of opposition received in European Application No. 3937157 dated Jan. 23, 2025, with translation, 12 pages.
Prof. Dr. med. Hermann KImmer, dated Nov. 18, 2024, with translation, 2 pages.
Realistic treatment of hand and wrist fractures, Surgical training taken to a higher level, Dated 11-12, 2014, 3 pages.
Rimasys GmbH, Consolidated List, received in European Application No. 21 192 123.4, 2 pages.
Rimasys GmbH, Konsolidierte Liste receive in European Application 16753848.7, 2 pages.
Summons to Oral Proceedings received in European Application No. 16753848.7-1218 dated Feb. 19, 2025, with translation, 4 pages.
Wrist Master Class, Radusverletzungen realitaetsnah versorgen, Nov. 14-15, 2014, with translation, 8 pages.
Communication relating to opposition received in EP Patent No. 3 491 635 B1 dated Feb. 1, 2024, with translation, 70 pages.
Consultation and Submission received in EP Application No. 16 753 848.7-1222 dated Mar. 25, 2022, with translation, 22 pages.
Minutes Oral Proceedings received in EP Application No. 16 753 848.7-1218 dated Apr. 20, 2022, with translation, 18 pages.
Notification of Oppositions received in EP Application No. 16753848.7-1218 dated May 13, 2024, with translation, 195 pages.
Office Action received in EP Application No. 21 192 123.4-1218 dated May 10, 2023, with translation, 18 pages.
Office Action received in Switzerland Application No. 370/181 dated May 1, 2018, translation only, 1 page.
Summons to oral proceedings received in EP Application No. 16 753 848.7-1222 dated Nov. 4, 2021, with translation, 22 pages.
Third Party Objection received in German Application No. 11 2016 003 246.3 dated Feb. 20, 2020, with translation, 34 pages.
Third Party Observation received in EP Publication No. 3491635 dated Oct. 19, 2022, with translation, 8 pages.
Wikipedia, "Wheels", with translation, 7 pages.

\* cited by examiner

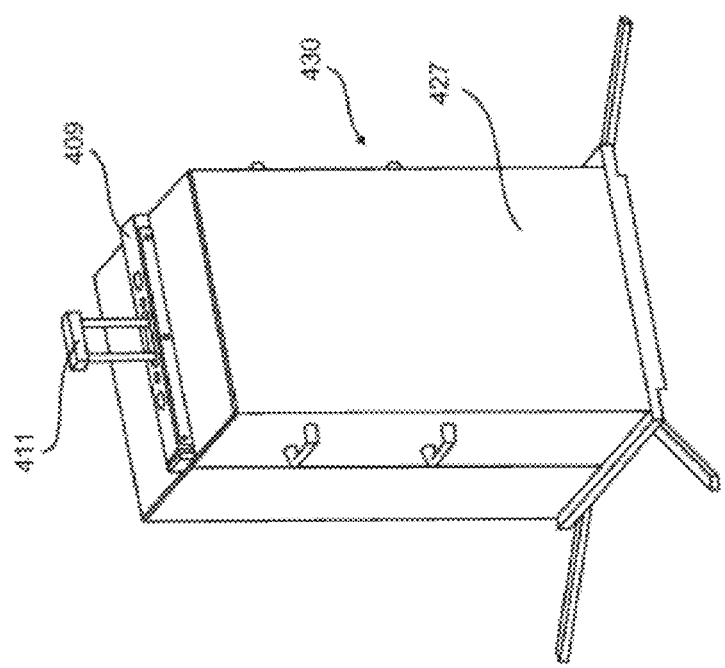

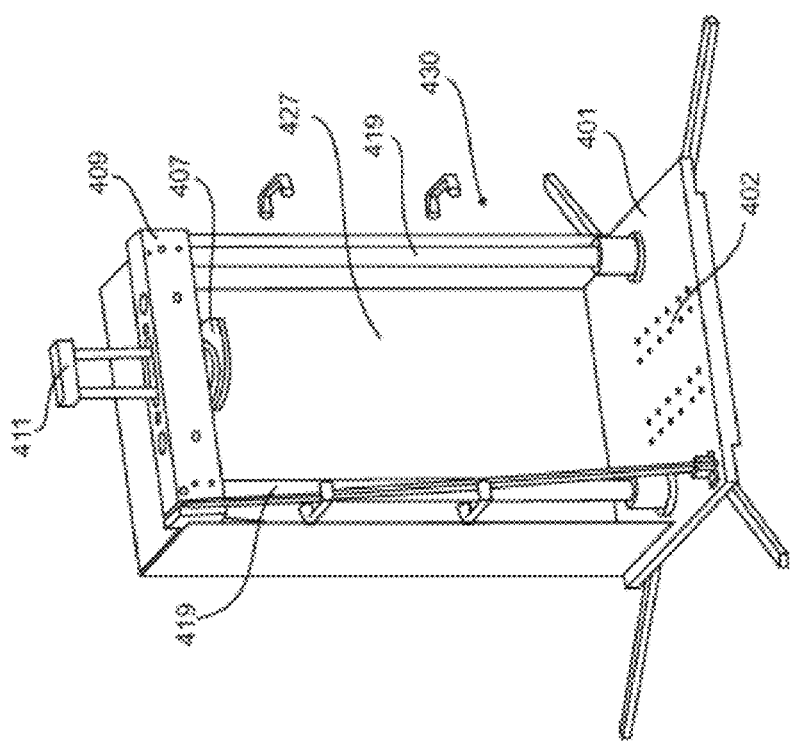

METHOD FOR REPRODUCIBLE PRODUCTION OF DEFINED BONE FRACTURES

CROSS-REFERENCE TO RELATED APPLICATIONS

This application is a National Stage entry of International Application No. PCT/EP2016/068217, filed Jul. 29, 2016, the disclosure which is hereby incorporated in its entirety by reference.

The subject-matter of the invention relates to a method of reproducible production of defined bone fractures with accompanying soft tissue injuries in anatomical specimens, in particular anatomical human specimens, apparatuses for applying the method and the specimens, in particular human specimens, produced with the aid of the method and characterized by a defined bone fracture with accompanying soft tissue injuries. The specimens produced with the method according to the invention, in particular human specimens, can be used in the schooling, teaching and development of medical staff, for the development and validation of medical instruments, implants and prostheses, for the analysis of accidents and for expert opinions.

Surgical training and continuing education offers certified courses that involve hands-on training in surgical procedures, in which case the practical portions rely on artificial bones or intact, uninjured human specimens as "practice patients". This results in a large discrepancy between the situation in continuing training courses and reality in the operating room. The majority of surgical methods can therefore only be discussed theoretically.

Artificial bones do not have the same biomechanical properties as human bones. This means that e.g. screws have an entirely different seat in artificial bones compared to human bones. Likewise, the different bone qualities of patients in day-to-day clinical operations also play a major role for the type of care. The choice of the installed implant then depends materially on the genetic and age-related bone quality and on the inhomogeneous structure of the bone itself. Artificial bones do not have the ability to adequately render these differences. For these reasons, working with various technical medical devices such as osteosynthesis materials, screws, and implants, or procedures such as drilling and milling cannot be adequately practiced with artificial bones. Yet another disadvantage is that until now, the available courses have not taken into account the soft tissue (skin, sub-cutaneous tissue, muscles, etc.). Surgical procedures are performed on the "bare" bone and working with soft tissue, a crucial aspect of the post-surgical outcome, cannot be conveyed with this method.

Training and continuing education courses are therefore offered that perform the practical portions on human specimens. While surgical procedures on human specimens can be performed with preserved soft tissue, the bones and surrounding soft tissue are unharmed in this case. Osteosynthesis materials can only be applied on unharmed bones. This is trivial for experienced doctors. The objective of this continuing education must for this reason be seen as deficient. Until now, there are no specimens available with realistic bone fractures, e.g. bone fractures with accompanying soft tissue injuries as occur in actual accidents. Realistic training and continuing education with realistic bone fractures and realistic soft tissue injuries is currently not possible.

Practitioners attempt to compensate the problem of the non-existent bone fracture in human specimens by exerting invasive forces directly on the specimen. The bone fractures are produced on the human specimens by participants themselves with tools such as saw, chisel, hammer, or surgical instruments. This involves exerting large amounts of energy on the specimen. Current practice results in collateral damage on the specimen and in deficient quality, both of the bone fractures produced thereby and of the soft tissue surrounding the bone. While this direct introduction of force can typically reliably target the targeted area with visual means, the direction of the introduced force does not match that of the line of action during an actual accident mechanism The direct introduction of force opens the soft tissue envelope and the soft tissue surrounding the bone is severely damaged with unrealistic effect. The bone fractures produced by these methods therefore do not correspond to those in actual bone fractures produced by the indirect introduction of force. In particular, they differ with respect to their geometry and properties of the involved bone fragments from the typical fracture patterns produced in an actual accident. Likewise, the typical ligament injuries (on capsules, ligaments, and tendons) are also not generated. The manual introduction of force with tools from non-standardized heights and angles then generates varying results on the specimen and is not standardized. The unique nature of the specimens in terms of morphology and geometry is not taken into account.

Other methods known to the prior art are simple physical experiments that involve introducing high energies into the specimens. These investigations always study how an injury occurs or how specimens react when they are exposed to a potential injury mechanism in a practical test.

Amis, A. and Miller, J. (1995), Injury Vol. 26, No. 3: 163-168 investigated the occurrence of elbow fractures on 40 specimens for which the bone was surrounded by sub-cutaneous soft tissue. The bone was laid bare on one end, was embedded in polymethacrylate bone cement, was attached to a mass of 60 kg, and then movably suspended horizontally on two rods. The mass of 60 kg was intended to simulate the inertia properties of the human torso. The injuries in the specimen were produced by a displaceable pendulum with a mass of 20 kg, which impacted the specimen from various displacements. A device with angular adjustment was used to secure the position of the humerus shaft specimen such that the flexion and extension movement of the elbow joint was located on the motion plane of the pendulum. Force impact tests were performed at various elbow flexions and lower arm rotations. The location of initial contact of the pendulum with the specimen could in these cases not be accurately specified, so that both lower arm bones were placed under load simultaneously or only one bone was placed under load initially. Based on an accuracy rate of 37.5%, a distal radius fracture was produced at flexion angles of 0 to 80 degrees at force impacts from 0.3 to 6.1 kN. An ulna fracture was produced with an accuracy rate of 32.5% at flexion angles from 60 to 135 degrees and force impacts from 2.1 to 6.8 kN.

McGinley, J. et al. (2003) The Journal of Bone and Joint Surgery: 2403-2409 positioned human specimens in a vertical orientation in relation to a gravitationally accelerated mass of 27 kg that was dropped from a height of 90 cm on the clamped-in specimens. After the impact, the mass was decelerated by two springs in order to prevent crushing the specimens. At a specified lower arm rotation of 2, 4, 6 and 8 degrees (5+/−2.6 degrees), this procedure produced a proximal radial fracture in the clamped-in specimens with accompanying distal ulna fracture. An isolated radius head fracture was produced at a specified lower arm rotation of 40, 41, 42, 45, 50, and 53 degrees (44.4+/−5.2 degrees), and Essex-Lopresti fractures were produced at a specified lower arm rotation of 51, 54, 58, 90, 108, and 110 degrees (70+/−25.2 degrees). A proximal radius fracture with accompanying distal ulna fracture was produced in 4 of 20 specimens (e.g. accuracy rate of 20%), an isolated radius head fracture was produced in 7 of 20 specimens (e.g. accuracy rate of 35%), and an Essex-Lopresti fracture was produced in 9 of 20 specimens (e.g. accuracy rate of 45%). While the studies by McGinley et al. left the soft tissue of the lower arm intact, the hand was completely removed from the arm. A realistic fall onto the outstretched arm could therefore not be simulated. Whether the produced fractures corresponded to reality was not verified. The deformation or compression of the specimens by the employed device was not specified.

McGinley, J. et al. (2006) Skeletal Radiol. 35: 275-281 examined the injury patterns on IOMs (interosseous membranes) in human specimens.

Delye, H. et al. (2007) Journal of Neurotrauma 24: 1576-1586 produced skull fractures on skull specimens without soft tissue using a mechanical pendulum having a mass of 14.3 kg and a pendulum length of 128 cm.

Fitzpatrick, M. et al. (2012) J. Orthop Trauma, Vol. 0, No. 0:1-6 examined specimens without soft tissue envelope. The samples were clamped into a machine and compressed while internally rotated.

The introduction of force was intended to test the failure limits of biological material and did not simulate actual accident events. Defined fractures were not produced.

Masouros, S. et al. (2013) Annals of Biomedical Engineering, DOI: 10.1007/s10439-013-0814-6 investigated the effects of an explosion on the lower extremity. For this purpose, the specimens were secured in two different positions (standing and seated position), in which case the foot with shoe was secured to the lid of a pressurized cylinder. Gas was pumped into the cylinder until the pressure in the interior of the cylinder was sufficiently large to explosively accelerate the lid upward against the specimen. This study produced various random injuries, but did not produce defined fractures in a controlled manner.

Henderson, K. et al. (2013) "Biomedical Response of the Lower Leg under High Rate Loading" IRCOBI Conference 2013, also investigated the lower extremities in specimens without soft tissue envelope. This involved clamping the specimens into a device and letting masses with a weight of 38.5 kg to 61.2 kg drop onto the specimens from a height of 1 to 2.3 m. The produced fractures were then examined.

Robert Holz (2013) Master Thesis "The Mechanism of Essex-Lopresti: Investigation of tissue failure using a newly developed simulator") used a simulator with gravitationally accelerated falling body in order to investigate the biomechanics and injury sequence of the Essex-Lopresti fracture. This involved laying the specimen bare, e.g. the skin and subcutaneous tissue including muscles were removed and the arm specimens were laid bare down to the IOM (interosseous membrane), and joint capsules were laid bare around the elbow and wrist joint. Holz describes the alignment and clamping of the specimen into the simulator, the optical analysis for producing the fracture and the methods for determining the horizontal and vertical, along with the relative movement of the segments while producing the fracture. Holz was able to produce the Essex-Lopresti fracture in 4 of 30 cases, e.g. with an accuracy rate of 13.3% in specimens without soft tissue envelope.

Marc Ebinger (2013) (Master Thesis "Design and evaluation of a novel simulator for high-speed injuries of the human forearm") discloses a drop test stand for producing axial impact loads. Piezo-electrical force sensors were used in this case to record the force curve. The kinematics were recorded with three high-speed cameras. The test stand was used to produce and analyze Essex-Lopresti, Monteggia, and Galeazzi injuries in human specimens without soft tissue envelope. For further theses, Ebinger recommends designing adapters to standardize securing the specimens in order to minimize error sources due to the operator.

Dieter Fink (2013) (Master Thesis: "Conceptual design and implementation of a software package for synchronizing, data recording, and metrology signal rendering for the Essex-Lopresti simulator") discloses the selection of suitable metrology and methods for analyzing metrology results for investigating and validating the injury sequence for the occurrence of an Essex-Lopresti on human specimens.

Wegmann, K et al. (2014) Acta Orthopaedica; 85 (2): 177-180 investigated the occurrence of an Essex-Lopresti on human specimens without soft tissue envelope. This involved marking the laid-bare bone specimens and producing bone fractures with a device with gravitationally accelerated falling body. The injury sequence was analyzed with high-speed cameras.

Deborah R. Marth (2002) (Dissertation "Biomechanics of the shoulder in lateral impact") investigated the injuries on twelve full-body cadavers during a car accident involving a side impact. The cadaver specimens were positioned on a chair, tied down, and the head was lifted with the help of a pulley system in order to facilitate an upright position of the human specimen. Accelerometers were attached on specimens in various key anatomic locations, in which case the bone was not preloaded. The lateral force impact was executed using a pneumatic machine in the form of a cylinder (23.4 kg). This involved centering the center point of the cylinder on the laterally visible acromion. The specimens were split into two groups. One group (n=6) was exposed to a force impact with a speed of 4.47 m/s (Group A), the other (n=6) with a speed of 6.71 m/s (Group B). The analysis was performed by taking x-ray images and by performing autopsies. The most frequent injuries in Group A were rib fractures. In Group B, 5 of 6 specimens either had a clavicle fracture (exact location not specified) or an acromion fracture and at least 4 rib fractures. At a cylinder speed of 5.7 m/s, with an impact force of 2916 N and a deformation stiffness between acromion and the Ti vertebrae of 23%, the probability of a serious shoulder injury (MS 2+) was 50%. Critical comments concerning the study design were made with regard to the targeting accuracy of the force impact in combination with the varying anthropometric attributes and soft tissue masses of the test specimens. Marth observed that the impact was not always the same; the specimens that were exposed to the accident scenario therefore exhibited random injuries.

The bone fracture produced by the prior art are random products. There are no known methods by which defined bone fractures can be produced in a controlled manner.

Bone fractures can be assigned to defined fracture classes. With respect to their localization and with respect to their fracture patterns, bone fractures are equivalent or very similar after taking into account the individual anatomic variability between accident victims. The defined bone fractures are also equivalent or very similar with respect to the accompanying soft tissue injuries of the individual accident victims.

Specimens with realistic bone fracture are needed in order to develop better implants, prosthesis, osteo-synthetic materials, and to improve the training of medical staff. Doctors, in particular surgeons, must show a certain number of surgeries in order to earn their qualifications and to perform surgeries unsupervised. This is a considerable expense of time, and "practicing on the patient" has the potential of harming the patient themselves. Doctors rely on certified continuing education courses that involve practicing surgical procedures on human specimens. There are until now no courses available with realistic bone fractures on specimens.

Human specimens are body donations. Ethical reasons call for methods that can produce defined, realistic bone fractures in specimens with a high accuracy rate. For ethical reasons, methods by which bone fractures are produced randomly with low probability are not suited for commercial use.

There is therefore a large need for methods by which defined, realistic bone fractures can be reproducibly produced with a high accuracy rate in human specimens in a controlled manner. There is also a large need for human specimens produced using these methods, and also use of such specimens for training and continuing education, as well as for the medical device industry.

These tasks are solved by the methods, specimens, and devices according to the invention.

The subject-matter of the invention is a method for producing at least one defined bone fracture with accompanying soft tissue injuries in a Specimen 106, characterized in that a defined force impact is applied on a secured Specimen 106 and in that the length change of Specimen 106 is limited to a maximum of 80 mm along the force vector. Preferably, the length change of Specimen 106 is limited to a maximum of 80 mm by adjusting a defined compression to which Specimen 106 is exposed during the force impact. The defined bone fracture can be produced in Specimen 106 by the method according to the invention by a force impact resulting from a kinetic energy of 5 to 500 Joule.

The subject-matter of the invention is a method for producing at least one defined bone fracture with accompanying soft tissue injuries in a Specimen 106 by adjusting a defined compression comprising
a) Selecting a defined bone fracture;
b) Securing Specimen 106;
c) Adjusting a defined mass and positioning the defined mass with Holding Mechanism 114, 214;
d) Adjusting a defined speed with which the defined mass impacts Specimen 106;
e) Adjusting a defined compression to which Specimen 106 is exposed on impact by the defined mass when Holding Mechanism 114, 214 is released;
f) Adjusting a defined damping to which Specimen 106 is exposed on impact by the defined mass when Holding Mechanism 114, 214 is released;
g) Releasing Holding Mechanism 114, 214 to accelerate the defined mass in direction of Specimen 106;
h) Removing the clamping of Specimen 106;
wherein steps b to f) can be performed in a variable order and wherein the adjustment of a defined damping is optional. This involves limiting the length change of Specimen 106 along the force vector to a maximum of 80 mm. This can be achieved by adjusting a defined compression.

The method according to the invention reproducibly produces a defined bone fracture with accompanying soft tissue injuries in a Specimen 106 with a probability of at least 50%, preferably at least 55%, 60%, 65%, 70%, 75%, 80%, 85%, 90%, 95%.

The method limits the length change of Specimen 106 along the force vector. Preferably, the maximum length reduction of Specimen 106 is 80 mm, for example preferably a maximum of 65 mm, particularly preferably a maximum of 52 mm or less. The maximum compression of the specimen is 80 mm, preferably a maximum of 65 mm, particularly preferably a maximum of 52 mm. The defined maximum compression the specimen experiences upon impact of the mass is 80 mm, preferably from 1 mm to 60 mm, particularly preferably from 2 mm to 55 mm.

A special embodiment of the method dampens the force impact upon impacting the specimen. In another embodiment of the method, the impact on the specimen is undamped A preferred embodiment of the method executes the force impact by impacting a defined mass moving in the direction of the specimen at a defined speed. The method according to the invention can be performed using a Device 100, 200 pursuant to FIG. 1 or FIG. 2. The defined speed in method step d) can be adjusted with a defined drop height when Device 100, 200 is used. The defined compression and the defined damping can be adjusted with Means for Adjusting the Defined Damping upon Impact 110, 210.

The defined bone fracture can for example be selected from a shaft fracture of the phalanges, a shaft fracture of the metacarpals, radius fracture, distal radius fracture, distal radius fracture extension, distal radius fracture flexion, distal radius fracture die-punch fracture, distal radius fracture chauffeur's fracture, scaphoid fracture, radius head fracture, coronoid fracture, terrible triad, olecranon fracture, Monteggia fracture, Monteggia-like lesion, Galeazzi fracture, capitulum fracture, humerus fracture, distal humerus fracture, proximal humerus fracture, clavicle shaft fracture, lateral clavicle fracture, medial clavicle fracture, femur fracture, distal femur fracture, proximal femur fracture, tibia head fracture, proximal tibia head fracture, distal tibia head fracture, talus fracture, pilon fracture, calcaneus fracture, malleolus fracture, navicular fracture, patella fracture, metatarsal fracture, scapula fracture, arm fracture, hand fracture, ankle fracture, vertebrae fracture, rib fracture, sacrum fracture, foot fracture, metatarsal fracture, hip fracture, luxation fracture.

The specimen can be a human specimen or an animal specimen. The specimen can be a formalin-fixed specimen, a Thiel-fixed specimen, or a defrosted specimen.

The defined mass has a weight of at least 1 kg, preferably a maximum weight of 72 kg, particularly preferably a weight from 5 kg to 33 kg or 4 to 40 kg. The defined mass is positioned in axial direction, preferably in vertical direction in relation to the specimen. The defined mass can for example be adjusted by a Mass 112 and one or several Add-on Weights 113.

The defined speed of the defined mass on impacting the specimen is at least 0.5 m/s, preferably at least 3 m/s to 10 m/s, particularly preferably 5 m/s to 6 m/s. The defined drop height is for example 10 cm to 150 cm, preferably from 20 cm to 120 cm.

The defined bone fracture can be produced in Specimen 106 using the method according to the invention by a force impact resulting from a kinetic energy from 5 to 500 Joule, preferably 15 to 300 J. The force exerted on the specimen upon impacting the defined mass is preferably 50 N, preferably a maximum of 34 kN. The generated kinetic energies for example are 15-450 J, preferably 120 to 250 J (see Table 2).

The defined damping with which the mass is decelerated upon impacting the specimen can for example by adjusted with at least one impact damper, preferably at least one hydraulic impact damper. The impact can occur undamped (defined damping equal to zero), or a defined damping can be adjusted (defined damping greater than 0). The defined damping, which is adjusted with one or several Means for Adjusting the Defined Damping 110, 210, for example impact dampers, is a maximum of 50 mm, preferably from 0 mm to 40 mm, particularly preferably from 5 mm to 25 mm or 37 mm.

Defined bone fractures are bone fractures that occur on bones during actual accidents. Defined bone fractures are known to the person trained in the art, for example based on AO classifications (Maurice E. Müller: The Comprehensive Classification of Fractures of Long Bones in: M. E. Miiller and others (published): Manual of Internal Fixation $3^{rd}$ edition p. 118 et seq. Springer-Verlag, Berlin/Heidelberg/New York/Tokyo 1991, ISBN 3-540-52523-8), Orthopedics and Accident Surgery Essentials (Steffen Ruchholtz, Dieter Christian Wirtz), Intensive Continuing Education Course ($2^{nd}$ completely revised and expanded edition. 1155 figures. Paperback. Thieme Georg Verlag, November 2012—hardbound—770 pages), Orthopedics and Accident Surgery, Medical specialist knowledge pursuant to the new continuing education code ((2011) $2^{nd}$ edition, Scharf, Hanns-Peter; Rüter, Axel; Pohlemann, Tim, Marzi, Ingo; Kohn, Dieter; Günther, Klaus-Peter).

According to the invention, methods for producing single fragment fractures (only one fracture gap), piece fractures (up to three additional fragments) and comminuted fractures (more than three additional fragments). Defined bone fractures comprise shaft fractures (diaphyseal fractures), corner fractures (metaphyseal fractures), and joint fractures (fractures involving the joint surface and luxation fractures).

According to the invention, the defined bone fracture is reproducibly produced with the method. This means that a defined bone fracture is selected and produced with a certain probability, e.g. with a certain accuracy rate, using the method according to the invention. Reproducible means that the defined bone fracture is produced with a minimum probability of at least 50%, preferably at least 60%, 70%, 80%, 85%, 90%, 95% or greater. For the first time, the method according to the invention allows defined bone fractures to be predictably produced in specimens (not a random product).

Human specimens with defined bone fractures can therefore be produced for commercial use within ethical standards Reproducibility also reduces costs in all applications where these specimens are used since fewer reject specimens are produced.

The accompanying soft tissue injuries produced with the method according to the invention are characteristic for the respectively defined bone fracture and are therefore realistic. Open and closed bone fractures are comprised. A preferred embodiment of the method produces defined bone fractures with closed soft tissue envelope. The accompanying soft tissue injuries characteristic for the respectively defined bone fractures are known to the person trained in the art, for example from Tscherne H, Oestern H J: Pathophysiology and classification of soft tissue injuries associated with fractures. In: Fractures with soft tissue injuries. Tscherne H Gotzen L.: Berlin, Springer Verlage (1984), p. 1-9.

The subject-matter of the invention also comprises specimens produced with the method according to the invention.

The subject-matter of the invention is a Specimen 106, in particular a human specimen, having at least one defined bone fracture and accompanying soft tissue injuries, obtainable with the method according to the invention or produced in accordance with the method according to the invention. Until now, specimens with defined bone fractures and accompanying soft tissue injuries cannot be produced artificially. These injuries only occur in actual accidents on living humans. For the first time, corresponding specimens can be produced with the method according to the invention.

The subject-matter of the invention is a Specimen 106, in particular a human specimen, having at least one defined bone fracture and accompanying soft tissue injuries. The Specimen 106 according to the invention preferably comprises a bone fracture with accompanying soft tissue injuries from a shaft fracture of the phalanges, a shaft fracture of the metacarpals, radius fracture, distal radius fracture, distal radius fracture extension, distal radius fracture flexion, distal radius fracture die-punch fracture, distal radius fracture chauffeur's fracture, scaphoid fracture, radius head fracture, coronoid fracture, terrible triad, olecranon fracture, Monteggia fracture, Monteggia-like lesion, Galeazzi fracture, capitulum fracture, humerus fracture, distal humerus fracture, proximal humerus fracture, clavicle shaft fracture, lateral clavicle fracture, medial clavicle fracture, femur fracture, distal femur fracture, proximal femur fracture, tibia head fracture, proximal tibia head fracture, distal tibia head fracture, talus fracture, pilon fracture, calcaneus fracture, malleolus fracture, navicular fracture, patella fracture, metatarsal fracture, scapula fracture, arm fracture, hand fracture, ankle fracture, vertebrae fracture, rib fracture, sacrum fracture, foot fracture, metatarsal fracture, hip fracture, luxation fracture.

According to the invention, the soft tissue envelope is defined as all of the body's own tissue that surrounds the bone of a specimen. The biological tissue that surrounds the bone is more elastic and formable (softer) than the bone. The term "soft tissue envelope" also includes without limitation the main groups: muscles, ligaments, tendons, joint capsules, nerves, skin, and vessels. Other constituent elements include fascias, connective tissue, periosteum, bursa. These biological structures have various functions and morphologies and for this reason exhibit a range of mechanical properties. Based on these different properties, these structures respond differently to injury mechanisms. In actual accidents, this results in various injuries in the different tissues. These tissue-specific injuries in connection with a bone fracture are therefore also called "typical" or "accompanying soft tissue injuries".

Specimen 106 is preferably characterized in that the soft tissue envelope is closed. Alternatively, Specimen 106 is characterized in that the soft tissue envelope is open. The method according to the invention can be employed to produce specimens with defined bone fractures that exhibit soft tissue injuries. Moreover, specimens with defined bone fractures can be produced on which the soft tissue envelope is open. These openings can occur when pointy or sharp-edged bone fragments penetrate the soft tissue and finally the skin. It is clearly evident in these cases that the skin opening and the penetration of soft tissue occurred from the inside to the outside. This is clearly evident based on the shapes and the properties of the openings, and also based on the injured tissue located thereunder. These bone fractures are therefore clearly distinguishable from those on which the soft tissue injury occurred from the outside to the inside.

Special embodiments of the invention relate to specimens and the details of methods for fabricating the latter.

Method characterized in that the defined bone fracture is a shaft fracture of the phalanges and in that the defined compression of Specimen 106 is set to 2 to 8 mm and in that the defined damping is set to 0 to 5 mm. The specimen comprises a shaft fracture of the phalanges with accompanying soft tissue injuries, obtained in accordance with the method according to the invention.

Method characterized in that the defined bone fracture is a shaft fracture of the metacarpals and in that the defined compression of Specimen 106 is set to 6 to 14 mm and in that the defined damping is set to 0 to 9 mm. The specimen comprises a shaft fracture of the metacarpals with accompanying soft tissue injuries, obtained in accordance with the method according to the invention.

Method characterized in that the defined bone fracture is a distal radius fracture and in that the defined compression of Specimen 106 is set to 20 to 36 mm and in that the defined damping is set to 6 to 17 mm. The specimen comprises a distal radius fracture with accompanying soft tissue injuries, obtained in accordance with the method according to the invention.

Method characterized in that the defined bone fracture is a distal radius fracture extension of classification 23 A2, 23 C1-C3 (dorsal) according to AO and in that the defined compression of Specimen 106 is set to 22 to 30 mm and in that the defined damping is set to 6 to 14 mm. The specimen comprises a distal radius fracture extension of classification 23 A2, 23 C1-C3 (dorsal) according to AO with accompanying soft tissue injuries, obtained in accordance with the method according to the invention.

Method characterized in that the defined bone fracture is a distal radius fracture of classification 23 A2 (palmar) according to AO and in that the defined compression of Specimen 106 is set to 25 to 35 mm and in that the defined damping is set to 5 to 17 mm. The specimen comprises a distal radius fracture of classification 23 A2 (palmar) according to AO with accompanying soft tissue injuries, obtained in accordance with the method according to the invention.

Method characterized in that the defined bone fracture is a distal radius fracture/die-punch fracture of classification 23 C1-C2 according to AO and in that the defined compression of Specimen 106 is set to 22 to 31 mm and in that the defined damping is set to 9 to 15 mm. The specimen comprises a distal radius fracture die-punch fracture of classification 23 C1-C2 according to AO with accompanying soft tissue injuries, obtained in accordance with the method according to the invention.

Method characterized in that the defined bone fracture is a radius fracture/chauffeur's fracture of classification 23 B1 according to AO and in that the defined compression of Specimen 106 is set to 20 to 28 mm and in that the defined damping is set to 6 to 14 mm. The specimen comprises a radius fracture/chauffeur's fracture of classification 23 B1 according to AO with accompanying soft tissue injuries, obtained in accordance with the method according to the invention.

Method characterized in that the defined bone fracture is a scaphoid fracture 72 A2, B2-B3 according to AO and in that the defined compression of Specimen 106 is set to 24 to 32 mm and in that the defined damping is set to 10 to 17 mm. The specimen comprises a scaphoid fracture 72 A2, B2-B3 according to AO with accompanying soft tissue injuries, obtained in accordance with the method according to the invention.

Method characterized in that the defined bone fracture is a radius head fracture 21 B2 according to AO and in that the defined compression of Specimen 106 is set to 21 to 29 mm and in that the defined damping is set to 9 to 15 mm. The specimen comprises a radius head fracture 21 B2 according to AO with accompanying soft tissue injuries, obtained in accordance with the method according to the invention.

Method characterized in that the defined bone fracture is a coronoid fracture and in that the defined compression of Specimen 106 is set to 20 to 33 mm and in that the defined damping is set to 8 to 16 mm. The specimen comprises a coronoid fracture with accompanying soft tissue injuries, obtained in accordance with the method according to the invention.

Method characterized in that the defined bone fracture is a terrible triad and in that the defined compression of Specimen 106 is set to 24 to 38 mm and in that the defined damping is set to 10 to 18 mm. The specimen comprises a terrible triad with accompanying soft tissue injuries, obtained in accordance with the method according to the invention.

Method characterized in that the defined bone fracture is an olecranon fracture and in that the defined compression of Specimen 106 is set to 4 to 17 mm and in that the defined damping is set to 0 to 9 mm. The specimen comprises an olecranon fracture with accompanying soft tissue injuries, obtained in accordance with the method according to the invention.

Method characterized in that the defined bone fracture is a Monteggia fracture and in that the defined compression of Specimen 106 is set to 28 to 46 mm and in that the defined damping is set to 10 to 17 mm. The specimen comprises a Monteggia fracture with accompanying soft tissue injuries, obtained in accordance with the method according to the invention.

Method characterized in that the defined bone fracture is a Monteggia-like lesion and in that the defined compression of Specimen 106 is set to 30 to 46 mm and in that the defined damping is set to 9 to 21 mm. The specimen comprises a Monteggia-like lesion with accompanying soft tissue injuries, obtained in accordance with the method according to the invention.

Method characterized in that the defined bone fracture is a Galeazzi fracture and in that the defined compression of Specimen 106 is set to 24 to 39 mm and in that the defined damping is set to 6 to 17 mm. The specimen comprises a Galeazzi fracture with accompanying soft tissue injuries, obtained in accordance with the method according to the invention.

Method characterized in that the defined bone fracture is a capitulum fracture and in that the defined compression of Specimen 106 is set to 14 to 22 mm and in that the defined damping is set to 6 to 13 mm. The specimen comprises a capitulum fracture with accompanying soft tissue injuries, obtained in accordance with the method according to the invention.

Method characterized in that the defined bone fracture is a humerus fracture and in that the defined compression of Specimen 106 is set to 26 to 44 mm and in that the defined damping is set to 0 to 16 mm. The specimen comprises a humerus fracture with accompanying soft tissue injuries, obtained in accordance with the method according to the invention.

Method characterized in that the defined bone fracture is a distal humerus fracture and in that the defined compression of Specimen 106 is set to 26 to 37 mm and in that the defined damping is set to 0 to 15 mm. The specimen comprises a distal humerus fracture with accompanying soft tissue injuries, obtained in accordance with the method according to the invention.

Method characterized in that the defined bone fracture is a clavicle shaft fracture and in that the defined compression of Specimen 106 is set to 4 to 12 mm and in that the defined damping is set to 0 to 6 mm. The specimen comprises a clavicle shaft fracture with accompanying soft tissue injuries, obtained in accordance with the method according to the invention.

Method characterized in that the defined bone fracture is a lateral clavicle shaft fracture and in that the defined compression of Specimen 106 is set to 5 to 14 mm and in that the defined damping is set to 0 to 7 mm. The specimen comprises a lateral clavicle shaft fracture with accompanying soft tissue injuries, obtained in accordance with the method according to the invention.

Method characterized in that the defined bone fracture is a proximal humerus fracture 11 B 1, B3, C1-C3 according to AO and in that the defined compression of Specimen 106 is set to 29 to 44 mm and in that the defined damping is set to 0 to 16 mm. The specimen comprises a proximal humerus fracture 11 B 1, B3, C1-C3 according to AO with accompanying soft tissue injuries, obtained in accordance with the method according to the invention.

Method characterized in that the defined bone fracture is a distal femur fracture and in that the defined compression of Specimen 106 is set to 31 to 49 mm and in that the defined damping is set to 0 to 37 mm. The specimen comprises a distal femur fracture with accompanying soft tissue injuries, obtained in accordance with the method according to the invention.

Method characterized in that the defined bone fracture is a tibia head fracture and in that the defined compression of Specimen 106 is set to 35 to 47 mm and in that the defined damping is set to 10 to 13 mm. The specimen comprises a tibia head fracture with accompanying soft tissue injuries, obtained in accordance with the method according to the invention.

Method characterized in that the defined bone fracture is a talus fracture and in that the defined compression of Specimen 106 is set to 26 to 48 mm and in that the defined damping is set to 0 to 22 mm. The specimen comprises a talus fracture with accompanying soft tissue injuries, obtained in accordance with the method according to the invention.

Method characterized in that the defined bone fracture is a pilon fracture and in that the defined compression of Specimen 106 is set to 30 to 51 mm and in that the defined damping is set to 0 to 25 mm. The specimen comprises a pilon fracture with accompanying soft tissue injuries, obtained in accordance with the method according to the invention.

Method characterized in that the defined bone fracture is a calcaneus fracture and in that the defined compression of Specimen 106 is set to 25 to 43 mm and in that the defined damping is set to 0 to 18 mm. The specimen comprises a calcaneus fracture with accompanying soft tissue injuries, obtained in accordance with the method according to the invention.

Method characterized in that the defined bone fracture is a distal radius fracture 23 B3 according to AO and in that the defined compression of Specimen 106 is set to 25 to 36 mm and in that the defined damping is set to 10 to 16 mm. The specimen comprises a distal radius fracture 23 B3 according to AO with accompanying soft tissue injuries, obtained in accordance with the method according to the invention.

The method is executed by securing the specimen in one or several locations, by potting, clamping, or chucking the specimen preferably on the proximal or distal end. Prior to securing its position, the specimen can be aligned in a defined geometry.

In a preferred embodiment, the method for producing at least one defined bone fracture with accompanying soft tissue injuries in a Specimen 106 is executed with a Device 100, 200. Device 100, 200 comprises i. at least one Guide Column 118, 218,
ii. on one end of Guide Column 118, 218, a Base Plate 101, 201,
iii. a Crossmember 109, 209 with Die Punch 111, 211,
iv. where appropriate, at least one Means for Adjusting the Damping upon Impact of the Defined Mass 110, 210,
v. at least one clamping plate to secure Specimen 107, 207,
vi. a Mass 112, 212 and, where appropriate, an Add-on Weight 113, 213 to adjust a defined mass,
vii. at least one further Crossmember 115, 215 with at least one releasable Holding Mechanism 114, 214 to position the defined mass.

Crossmember 109, 209, 409 can be height-adjustable or not height-adjustable.

Device 100, 500, 600 can comprise means for testing, for example one or several Cameras 528 and/or one or several Force Sensors 103, 503 in order to continuously improve the repeatability (probability) that a defined bone fracture is produced and/or in order to better understand the sequences of various events while the load is applied. A Device 100, 500, 600 that comprises means for testing can be used to determine one or several parameters selected from the parameters determining the defined mass, the defined direction, the defined speed of the defined mass, the defined geometry of Specimen 106, the defined compression of Specimen 106, the defined damping upon impact of the defined mass. The procedure for determining defined parameters is described as follows and can be used by a person trained in the art to determine the defined parameters to produce further defined bone fractures in specimens using analogous procedures.

A special embodiment of Device 200 can be disassembled, thus becoming more readily transportable. This for example allows specimens to be produced on-site directly prior to the respective use. This is desirable because specimens with defined bone fractures and accompanying soft tissue injuries require special storage conditions. This is avoided by producing the specimens only immediately prior to use. The subject-matter of the invention is a Device 200 for executing the method according to the invention that can be disassembled into a Drive Module 229, 329 and a Test Module 230, 430 for transporting the device.

The subject-matter of the invention is a Drive Module 329, 229 for a Device 200 for reproducibly producing at least one defined bone fracture with accompanying soft tissue injuries in a Specimen 106, comprising or consisting of i. at least one Guide Column 218, 318,
ii. a Mass 212, 312 and, where appropriate, an Add-on Weight 213, 313 for adjusting a defined mass,
iii. at least one Crossmember 215, 315 with at least one releasable Holding Mechanism 214, 314 for positioning the defined mass,
iv. where appropriate, an Enclosure 227, 327, characterized in that the drive module comprises no Means to Secure Specimen 106.

The subject-matter of the invention is a Test Module 430, 230 for a Device 200 for reproducibly producing at least one defined bone fracture with accompanying soft tissue injuries in a Specimen 106, characterized in that the Test Module 430, 230 comprises no defined mass. The subject-matter of the invention is a Test Module 430, 230 for a Device 200 for reproducibly producing at least one defined bone fracture with accompanying soft tissue injuries in a Specimen 106, comprising or consisting of i. at least one Carrier Column 219, 419
ii. on one end of the Carrier Column, a Base Plate 201, 401,
iii. Means to Secure Specimen 402,
iv. at least one Crossmember 209, 409 with Die Punch 211, 411,
v. where appropriate, at least one Means for Adjusting the Damping 210 upon impact of the defined mass, and
vi. at least one Clamping Plate 202, 402 for securing Specimen 106,
vii. where appropriate, an Enclosure 227, 427,
characterized in that the Test Module 430, 230 comprises no defined mass.

Device 100, 200 should always be specially secured to avoid injuries on persons using Device 100, 200 for the method. Such a special securing mechanism for example comprises specially secured holding mechanisms for the defined mass and an Enclosure 227. The subject-matter of the invention is a Device 100, 200, 500 or a Drive Module 329, 229 comprising an at least doubly secured Holding Mechanism 214, 314 for positioning the defined mass. Device 100, 200, Drive Module 329, 229 and/or Test Module 430, 230, comprising at least one Enclosure 227, 328, 427.

The subject-matter of the invention is the use of Device 100, 200, 300, 400, 500, 600 to determine one or several parameters selected from the parameters determining the defined mass, the defined direction, the defined speed of the defined mass, the defined geometry of Specimen 106, the defined compression of Specimen 106, the defined damping upon impact of the defined mass. The subject-matter of the invention is use of Device 100, 200, 300, 400, 500, 600 to execute the method according to the invention. The subject-matter of the invention is use of Device 100, 200, 300, 400, 500, 600 to produce a defined bone fracture with accompanying soft tissue injuries in a Specimen 106, 506, preferably for reproducibly producing the defined bone fracture with a probability of at least 50%.

According to the invention, Specimen 106 is defined as a dead human body or a dead animal body or a part of a dead human body, for example a severed body part (e.g. arm, foot, knee) or a part of a dead animal body. Specimen 106 can be frozen. Depending on the objective and anatomic region, the defrosting process is initiated 15 to 24 hours prior to executing the method for producing the bone fracture. This involves removing Specimen 106 from the freezer (at minus 20 degrees Celsius), removing the packaging materials, and storing Specimen 106 at room temperature (20 to 22 degrees Celsius). Processing is possible at temperatures from 10 degrees Celsius up to 25 degrees Celsius, preferably 15 degrees Celsius to 23 degrees Celsius. A formalin or Thiel-fixed Specimen 106 can be processed directly without significant preparation. The donors of specimens are generally between 78 to 86 years of age, but the donors can at the time of the donation also be older or younger. For a special embodiment of the method, Specimen 106 originates from a donor having an age above 60 years, 70 to 90 years, preferably 78 to 86 years. For a special embodiment of the invention, Specimen 106 according to the invention comprising the defined bone fracture with accompanying soft tissue injuries has an age above 60 years, preferably from 70 to 90 years, particularly preferably from 78 to 86 years.

Specimen 106 can be a full body specimen or a body part or a defined anatomic region. Specimen 106 can comprise at least one anatomic region selected from the anatomic regions hand and 1 to 5 fingers, wrist, elbow, shoulder, knee, ankle, foot and 1 to 5 toes, hip, pelvis, spinal column, thorax, ribs. Specimen 106 can at least comprise one joint affected by the exertion of force, preferably 1 to 3 joints affected by the exertion of force. The joint or joints can in the defined geometry have a joint alignment, selected as neutral alignment, articulated, extended, rotated, varus or valgus alignment.

Force is preferably introduced into the specimen not directly but indirectly, for example using a Die Punch 111, 211, 511 using a Device 100, 200, 500. The indirect introduction of force allows Specimen 106, 506 to be accurately secured. The interface between Device 100, 500 and Specimen 106, 506 should be formed by a flush friction lock, for example by potting the end of Specimen 106, 506 into a Mold 105, 505 with a cold-curing polymer such as epoxy resin and securing Mold 105, 505 to Device 100, 500 using screws.

The position of Specimen 106 can be secured by clamping the latter proximally or distally in a defined geometry. The specimen can be rotated by a defined angle about at least one of the clamps and can then be secured in this defined geometry. The defined geometry of Specimen 106 in relation to the defined force impact when executing the method corresponds to the joint alignment and joint angles of a person or an animal in relation to the force impact introduced during an actual accident. The defined geometry of Specimen 106 can for example be easily determined by analyzing the accident sequence, for example based on documents, images, video recordings and/or eye witness accounts. One or several adapters can be used to secure Specimen 106 in the defined geometry when executing the method for producing a defined bone fracture with accompanying soft tissue injuries.

For an embodiment of the method, prior to securing Specimen 106, a part of the bone is laid bare on the proximal and distal end of Specimen 106, followed by potting said Specimen 106 in a defined geometry into a Mold 105, 505 using a curing material, followed by securing Specimen 106 on the proximal and distal end in a Device 100, 500 using a Clamping Plate 107, 507 and/or at least one Means to Secure Specimen 102, 502. For another embodiment of the method, prior to securing Specimen 106, a part of the bone is laid bare on the proximal and distal end of Specimen 106, followed by potting said Specimen 106 in a defined geometry into a Mold 105, 505 using a curing material, followed by securing the position of Specimen 106 on the proximal and distal end in a Device 100, 500 using a Clamping Plate 107, 507 and/or at least one Means to Secure Specimen 102, 502.

According to the invention, securing Specimen 106 is also defined as clamping Specimen 106.

Every person, e.g. the accident victim and every Specimen 106 has three axis of motion (sagittal, transversal, and longitudinal axis), which in turn span the three body planes (sagittal, transversal, and frontal planes) (internal coordinate system). The same applies for the space (external coordinate system), e.g. Device 100. When securing Specimen 106 in a defined geometry, the internal coordinate system of the specimen predetermined during an accident by the desired joint alignment of Specimen 106 is synchronized with the external coordinate system, which is predetermined by Device 100, 200, 500. The external coordinate system is not variable when a Device 100, 200, 500 is used, but is instead predetermined by Device 100, 200, 500. The internal coordinate system of Specimen 106 is flexible and is adjusted to the external coordinate system of Device 100, 200, 500 such that when the method according to the invention is executed, the joint alignment and, where appropriate, the joint angles are retroactively adjusted in Specimen 106 to reflect those that produce the defined bone fracture in an accident under actual conditions. In this manner, the method according to the invention simulates the realistic production of the defined bone fracture in a Specimen 106, 506. As a result, the method according to the invention does not produce random products, but instead, in a controlled manner, produces preselected, defined bone fractures with the real accompanying soft tissue injuries.

The clamping of Specimen 106 in the defined geometry emulates the joint alignment of the actual accident sequence with respect to the applied force direction. The selected clamping of Specimen 106 in Device 100, 200 while executing the methods results from the theoretical preparatory work performed during levels 1 and 2 (see description below) when determining the parameters for a newly defined bone fracture. Since the method according to the invention is intended to be a representation of a real trauma or accident, Specimen 106 is clamped into Device 100, 200 in a defined geometry resulting from the accident analyses. The angle settings of the joints can in this case for example be made with a goniometer. Since Device 100, 200 transfers the impulse through the Die Punch 111, 211, the intended geometry of the joint or joints in Specimen 106 must be renderable in relation to Die Punch 111, 211. This means that a Specimen 106 is clamped in a defined geometry to Die Punch 111, 211 of Device 100, 200. The effective mechanism of a Device 100, 200 to produce the defined bone fracture in Specimen 106 is always the same. For example by means of a gravitationally accelerated, defined mass that impacts Specimen 106 from a vertical direction with a defined kinetic energy, resulting in a defined force impact on Specimen 106.

In order to align Specimen 106 in the defined geometry, for example adapters and Molds 105, such as potting devices, foam pads, bandages, straps, cold-curing polymers, clamps, angle brackets, and other means are used. As a result, the clamping option for Specimen 106 in Device 100, 200 are highly variable and any conceivable bone fracture can be produced in this manner.

Foam pads or other means with similar properties can be used to protect the skin of the fractured Specimen 106. Foam pads protect the biological structures in Specimen 106, for example the wrist area, by passively increasing the force transfer surface. This prevents a fracture in Specimen 106 below the targeted position.

Specimen 106 can be aligned and clamped by employing one or several adapters that support the alignment and clamping in the defined geometry. For a person trained in the art, the adapter geometry is determined by the joint alignment and joint angles for the underlying real accident sequence.

For example, groups of accident scenarios can be compiled and technical adjustments can be made and/or adapters can be developed for the effective mechanism underlying this group in order to optimize the clamping of specimens in Device 100, 200. For example Adapter 04 can be employed for producing different classes of distal radius fractures. The design of the respective adapter is based on the orientation of the anatomical structures of the bones in Specimen 106 during an actual accident, based on the movement during the accident of the anatomical region that comprises the respective bone, and on the operating mechanism of Device 100, 200.

The following adapters can be used to secure and/or clamp a Specimen 106 in the defined geometry:

Adapter 01 has the shape of a bowl and can be clamped at various locations in Device 100, 200 in order to align a Specimen 106 in the defined geometry. Adapter 02 (hemisphere) has a spherical surface. Adapter 02 can be supported on the Base Plate 101, 201 of Device 100, 200. For example, a hand can be shifted from neutral alignment on the round surface of Adapter 02. Adapter 03 has the shape of a truncated cone. It can be supported on the Base Plate 101, 201 of Device 100, 200. A hand can be shifted laterally on the slanted surface of Adapter 03 until the hand has a radial abduction from the neutral alignment.

Adapter 04 is modeled after a handle or a bicycle handlebar. Adapter 04 can be supported on the Base Plate 101, 201 of Device 100, 200.

Adapter 05 has a slanted surface with an angle of 15 degrees and can be clamped in various locations of Device 100, 200 in order to align a Specimen 105 in the defined geometry.

Adapters 06 and 07 have the shape of a pin, wherein one end of the pin is rounded and Adapter 06 has a surface of approx. 3 $cm^2$ and Adapter 07 has a surface of 5 $cm^2$. The pin stands vertically with the rounded side facing Specimen 106 below the Die Punch 111, 211. The end of Adapter 06 or 07 is in this case placed centrally above the intended fracture location. Foam pads can be placed between the surface of the adapter and Specimen 106. The foam pads can have various hardness levels and prevent Adapter 06 or 07 from sliding off the intended fracture location and also passively increase the force transfer surface.

Adapter 08 has a slanted surface with an angle of 30 degrees and can be clamped at various locations in Device 100, 200 in order to align a Specimen 106 in the defined geometry.

Adapter 09 has a slanted surface with an angle of 45 degrees and can be clamped at various locations in Device 100, 200 in order to align a Specimen 106 in the defined geometry.

Adapter 10 has a slanted surface with an angle of 60 degrees and can be clamped at various locations in Device 100, 200 in order to align a Specimen 106 in the defined geometry.

Adapter 11 (finger plate double) and Adapter 12 (finger plate triple) are used to clamp fingers. In the vertical position, the wrist is held in neutral alignment and the phalanges of the respective finger members are inserted into Adapter 11 or 12. In this clamping arrangement, the dead weight of Die Punch 111, 211 holds Specimen 106 in the desired defined geometry. Adapter 11 or 12 is supported by surface contact on Base Plate 101, 2013 of Device 100, 200 and can slide on Base Plate 101, 201. With the finger digits inserted, the hand cannot be shifted laterally, or can only be shifted from neutral alignment when it does not stand stiffly, but instead yields under the dead weight of Die Punch 111, 211.

Adapter 13 is a humerus box for embedding the humerus and can be secured at various locations in Device 100, 200 in order to align a Specimen 106 in the defined geometry.

Adapter 14 is a height-adjustable clavicle frame for clamping the clavicle and can be secured at various locations in Device 100, 200 in order to align a Specimen 106 in the defined geometry. The medial end of the clavicle can be clamped on adapter 14 using a clamping ring.

Adapter 15 is an angle plate by which an angle from 90 to 130 degrees can be specified in Specimen 106.

Adapter 16 (sand box) is a mold that can be filled with sand and on which Specimen 106 can be supported. Foam pads can be placed on the floor of Adapter 16 under the supported Specimen 106. The adapter can be filled with quartz sand and screw-mounted on Base Plate 101, 201 of Device 100, 200. The fill volume of Adapter 16 can be varied depending on the bone fracture and employed Specimen 106.

Adapter 17 (knee flex clamp) is based on the model of an inverted vice. This means that Adapter 17 applies a parallel clamping from 2 sides on the selected Specimen 106. Specimen 106 is stably clamped as a result. Adapter 17 can be screwed together with Die Punch 111, 211. The force impact when the defined mass impacts the Die Punch 111, 211 is thereby directly transferred onto Specimen 106. Adapter 17 has a universal joint by which the surface that presses onto Specimen 106 can be adjusted. This allows the point of attack of the force to be accurately targeted for the defined bone fracture in the joint.

Adapter 18 (Monteggia clamp) is used for clamping, e.g. the lower arm. The adapter can be secured on Base Plate 101, 201 or on a location of Specimen 106.

Other adapters can be analogously developed when this is required by the defined geometry of Specimen 106 and/or Device 100, 200. Suitable adapters and other auxiliary materials are known to the person trained in the art.

An embodiment of the method clamps Specimen 106 or a certain anatomical structure in Specimen 106 centrally under the point of attack of the force, for example Die Punch 111, 211. This ensures that the kinetic energy results in the force impact at the correct location of the specimen, resulting in the defined bone fracture and accompanying soft tissue injuries. Another embodiment of the method clamps Specimen 106 decentrally under the point of attack of the force—e.g. Die Punch 111, 211—in order to produce the defined bone fracture. The clamping arrangement of Specimen 106 can differ depending on the defined bone fracture and anatomical region of Specimen 106. This involves securing Specimen 106 such that it remains secured when the force impact is exerted. While Specimen 106 can move when the force impact is exerted, it should preferably not yield or slide off. For this reason, a preferred embodiment of the invention lays bare and secures at least one bone end of Specimen 106 in a Mold 105, e.g. using a potting resin. Another embodiment of the invention secures both ends of specimen 106 in a Mold 105, e.g. by potting these. Mold or Molds 105 are secured in Device 100, 200, for example using Means to Secure Specimen 102, e.g. an adjustable carriage or a Clamping Plate 107. If one end of Specimen 106 is not potted, it is preferably "clamped". Without limitation, the following two options are available for this purpose: a) the end is clamped between at least 2 metal jaws—just like in a vice—e.g. using Adapter 17, orb) the end is placed vertically or at an angle of 90 degrees under the point of attack of the force, for example Die Punch 111, 211 such that Specimen 106 is held in position by its deadweight and by the weight of Die Punch 111, 211.

The methods described below for producing defined bone fractures in Specimens 106, 506 employ a Device 100, 200, 300 together with 400, 500. A gravitationally accelerated mass is used as the defined mass. The latter exerts a vertically directed force impact onto the specimens. The defined speed is therefore adjusted in Device 100, 200, 400, 500 by means of a height from which the defined mass drops onto Specimen 106. The defined compression and the defined damping are adjusted with Means for Adjusting the Damping upon Impact 110, 210, 510. Impact dampers are preferably used for this purpose in Device 100, 200, 300, 400, 500. When impact dampers are used, the adjustment is made with a path (travel). The damped portion of the compression then also adjusts the defined damping as a path.

Method for producing at least one defined bone fracture with accompanying soft tissue injuries in a Specimen 106 using a Device 100, 200 comprising the steps a) Select a defined bone fracture;
b) Select a Specimen 106;
c) Adjust a defined mass and position the defined mass in a defined alignment in relation to Specimen 106 using a Holding Mechanism 114, 214;
d) Align Specimen 106 in a defined geometry in relation to the direction from which the defined mass impacts the Specimen 106 when the Holding Mechanism 114, 214 is released, using Means to Secure Specimen 101, 102;
e) Adjust a defined speed with which the defined mass impacts Specimen 106 when Holding Mechanism 114, 214 is released;
f) Adjust a defined compression to which Specimen 106 is exposed when the defined mass impacts when Holding Mechanism 114, 214 is released;
g) Adjust a defined damping with which the defined mass is decelerated when impacting Specimen 106 when Holding Mechanism 114, 214 is released;
h) Release Holding Mechanism 114, 214 to accelerate the defined mass in the defined direction toward Specimen 106;
i) Remove the Means to Secure Specimen 102;
wherein Steps b) to g) can be performed in variable order.

The following examples are intended to explain the method and Specimens 106.

Method for producing a shaft fracture of the phalanges I-V (78 A2, B2, C2 according to AO) in a Specimen 106 using a Device 100, 200, characterized in that a) a shaft fracture of the phalanges I-V) is selected, b) a Specimen 106 comprising or consisting of hand and lower arm is selected, c) a defined mass of 5.2 to 9.8 kg is adjusted, d) the Specimen 106 is aligned with Means to Secure Specimen 102, for example as described in Example 1, in a defined geometry in relation to the direction from which the defined mass impacts Specimen 106 when Holding Mechanism 114, 214 is released, e) the defined speed is adjusted with a drop height from 29 to 46 cm, f) the defined compression is adjusted from 2 to 8 mm, g) the defined damping is adjusted from 0 to 5 mm as the damped portion of the compression, h) Holding Mechanism 114, 214 is released, i) Specimen 106 is removed from Device 100, 200. The subject-matter of the invention is a Specimen 106 comprising a shaft fracture of the phalanges I-V (78 A2, B2, C2 according AO), obtained by the aforementioned method for producing a shaft fracture of the phalanges I-V (78 A2, B2, C2 according to AO) in a Specimen 106.

Method for producing a shaft fracture of the metacarpals I-V (77 A2, B2, C2 according to AO) in a Specimen 106 using a Device 100, 200, characterized in that a) a shaft fracture of the metacarpals I-V) is selected, b) a Specimen 106 comprising or consisting of hand and lower arm is selected, c) a defined mass of 7 to 11.2 kg is adjusted, d) the Specimen 106 is aligned with Means to Secure Specimen 102, for example as described in Example 2, in a defined geometry in relation to the direction from which the defined mass impacts Specimen 106 when Holding Mechanism 114, 214 is released, e) the defined speed is adjusted with a drop height from 35 to 52 cm, f) the defined compression is adjusted from 6 to 14 mm, g) the defined damping is adjusted from 0 to 9 mm as the damped portion of the compression, h) Holding Mechanism 114, 214 is released, i)

Specimen 106 is removed from Device 100, 200. The subject-matter of the invention is a Specimen 106 comprising a shaft fracture of the metacarpals I-V (77 A2, B2, C2 according to AO), obtained by the aforementioned method for producing a shaft fracture of the metacarpals I-V (77 A2, B2, C2 according to AO) in a Specimen 106.

Method for producing a distal radius fracture of classification 23 A2, 23 C1-C3 (dorsal) according to AO in a Specimen 106 using a Device 100, 200, characterized in that a) a distal radius fracture of classification 23 A2, 23 C1-C3 (dorsal) according to AO is selected, b) a Specimen 106 comprising or consisting of hand, lower arm, and upper arm is selected, c) a defined mass of 16.8 to 19.3 kg is adjusted, d) the Specimen 106 is aligned with Means to Secure Specimen 102, for example as described in Example 3, in a defined geometry in relation to the direction from which the defined mass impacts Specimen 106 when Holding Mechanism 114, 214 is released, e) the defined speed is adjusted with a drop height from 76 to 102 cm, f) the defined compression is adjusted from 22 to 30 mm, g) the defined damping is adjusted from 6 to 14 mm as the damped portion of the compression, h) Holding Mechanism 114, 214 is released, i) Specimen 106 is removed from Device 100, 200. The subject-matter of the invention is a Specimen 106 comprising a distal radius fracture of classification 23 A2, 23 C1-C3 (dorsal) according to AO, obtained by the aforementioned method for producing a distal radius fracture of classification 23 A2, 23 C1-C3 (dorsal) according to AO in a Specimen 106.

Method for producing a distal radius fracture of classification 23 A2, 23 (palmar) according to AO in a Specimen 106 using a Device 100, 200, characterized in that a) a distal radius fracture of classification 23 A2, 23 (palmar) according to AO is selected, b) a Specimen 106 comprising or consisting of hand, lower arm, and upper arm is selected, c) a defined mass of 16.8 to 20.5 kg is adjusted, d) the Specimen 106 is aligned with Means to Secure Specimen 102, for example as described in Example 4, in a defined geometry in relation to the direction from which the defined mass impacts Specimen 106 when Holding Mechanism 114, 214 is released, e) the defined speed is adjusted with a drop height from 82 to 102 cm, f) the defined compression is adjusted from 25 to 35 mm, g) the defined damping is adjusted from 5 to 17 mm as the damped portion of the compression, h) Holding Mechanism 114, 214 is released, i) Specimen 106 is removed from Device 100, 200. The subject-matter of the invention is a Specimen 106 comprising a distal radius fracture of classification 23 A2, 23 (palmar) according to AO, obtained by the aforementioned method for producing a distal radius fracture of classification 23 A2, 23 (palmar) according to AO in a Specimen 106.

Method for producing a distal radius fracture die-punch fracture of classification 23 C1-C2 according to AO in a Specimen 106 using a Device 100, 200, characterized in that a) a distal radius fracture die-punch fracture of classification (conditional) 23 C1-C2 according to AO is selected, b) a Specimen 106 comprising or consisting of hand, lower arm, and upper arm is selected, c) a defined mass of 17 to 23.1 kg is adjusted, d) the Specimen 106 is aligned with Means to Secure Specimen 102, for example as described in Example 5, in a defined geometry in relation to the direction from which the defined mass impacts Specimen 106 when Holding Mechanism 114, 214 is released, e) the defined speed is adjusted with a drop height from 90 to 110 cm, f) the defined compression is adjusted from 22 to 31 mm, g) the defined damping is adjusted from 9 to 15 mm as the damped portion of the compression, h) Holding Mechanism 114, 214 is released, i) Specimen 106 is removed from Device 100, 200. The subject-matter of the invention is a Specimen 106 comprising a distal radius fracture die-punch fracture of classification 23 C1-C2 according to AO, obtained by the aforementioned method for producing a distal radius fracture die-punch fracture of classification 23 C1-C2 according to AO in a Specimen 106.

Method for producing a distal radius fracture chauffeur's fracture of classification 23 B1 according to AO in a Specimen 106 using a Device 100, 200, characterized in that a) a distal radius fracture chauffeur's fracture of classification 23 B1 according to AO is selected, b) a Specimen 106 comprising or consisting of hand, lower arm, and upper arm is selected, c) a defined mass of 16.6 to 28.3 kg is adjusted, d) the Specimen 106 is aligned with Means to Secure Specimen 102, for example as described in Example 6, in a defined geometry in relation to the direction from which the defined mass impacts Specimen 106 when Holding Mechanism 114, 214 is released, e) the defined speed is adjusted with a drop height from 80 to 93 cm, f) the defined compression is adjusted from 20 to 28 mm, g) the defined damping is adjusted from 6 to 14 mm as the damped portion of the compression, h) Holding Mechanism 114, 214 is released, i) Specimen 106 is removed from Device 100, 200. The subject-matter of the invention is a Specimen 106 comprising a distal radius fracture chauffeur's fracture of classification 23 B1 according to AO, obtained by the aforementioned method for producing a distal radius fracture chauffeur's fracture of classification 23 B1 according to AO in a Specimen 106.

Method for producing a scaphoid fracture 72 A2, B2-B3 according to AO in a Specimen 106 using a Device 100, 200, characterized in that a) a scaphoid fracture 72 A2, B2-B3 according to AO is selected, b) a Specimen 106 comprising or consisting of hand and lower arm is selected, c) a defined mass of 16.8 to 19.5 kg is adjusted, d) the Specimen 106 is aligned with Means to Secure Specimen 102, for example as described in Example 7, in a defined geometry in relation to the direction from which the defined mass impacts Specimen 106 when Holding Mechanism 114, 214 is released, e) the defined speed is adjusted with a drop height from 75 to 88 cm, f) the defined compression is adjusted from 24 to 32 mm, g) the defined damping is adjusted from 10 to 17 mm as the damped portion of the compression, h) Holding Mechanism 114, 214 is released, i) Specimen 106 is removed from Device 100, 200. The subject-matter of the invention is a Specimen 106 comprising a scaphoid fracture 72 A2, B2-B3 according to AO, obtained by the aforementioned method for producing a scaphoid fracture 72 A2, B2-B3 according to AO in a Specimen 106.

Method for producing a radius head fracture 21 B2 according to AO or Type I-III in accordance with Mason (Br J Surg. 1954 September; 42(172):123-32. Some observations on fractures of the head of the radius with a review of one hundred cases. MASON ML) in a Specimen 106 using a Device 100, 200, characterized in that a) a radius head fracture 21 B2 according to AO or Type I-III in accordance with Mason is selected, b) a Specimen 106 comprising or consisting of hand, lower arm, and upper arm is selected, c) a defined mass of 18.3 to 21.5 kg is adjusted, d) the Specimen 106 is aligned with Means to Secure Specimen 102, for example as described in Example 8, in a defined geometry in relation to the direction from which the defined mass impacts Specimen 106 when Holding Mechanism 114, 214 is released, e) the defined speed is adjusted with a drop height from 75 to 88 cm, f) the defined compression is adjusted from 21 to 29 mm, g) the defined damping is adjusted from 9 to 15 mm as the damped portion of the compression, h) Holding Mechanism 114, 214 is released, i) Specimen 106 is removed from Device 100, 200. The subject-matter of the invention is a Specimen 106 comprising a radius head fracture 21 B2 according to AO or Type I-III in accordance with Mason, obtained by the aforementioned method for producing a radius head fracture 21 B2 according to AO or Type I-III in accordance with Mason in a Specimen 106.

Method for producing a coronoid fracture (21 B1 according to AO or Type I-III Regan & Money (Regan W, Money B F Fractures of the coronoid process of the ulna. J. Bone Joint Surg [Am] 1989; 71-A:1348-54)) conditional in a Specimen 106 using a Device 100, 200, characterized in that a) a coronoid fracture (21 B1 according to AO or Type I-III Regan & Money) is selected, b) a Specimen 106 comprising or consisting of hand, lower arm, and upper arm is selected, c) a defined mass of 18.2 to 22.8 kg is adjusted, d) the Specimen 106 is aligned with Means to Secure Specimen 102, for example as described in Example 9, in a defined geometry in relation to the direction from which the defined mass impacts Specimen 106 when Holding Mechanism 114, 214 is released, e) the defined speed is adjusted with a drop height from 75 to 86 cm, f) the defined compression is adjusted from 20 to 33 mm, g) the defined damping is adjusted from 8 to 16 mm as the damped portion of the compression, h) Holding Mechanism 114, 214 is released, i) Specimen 106 is removed from Device 100, 200. The subject-matter of the invention is a Specimen 106 comprising a coronoid fracture (21 B1 according to AO or Type I-III Regan & Money), obtained by the aforementioned method for producing a coronoid fracture (21 B1 according to AO or Type I-III Regan & Money) in a Specimen 106.

Method for producing a terrible triad (21 C1 according to AO) in a Specimen 106 using a Device 100, 200, characterized in that a) a terrible triad (21 C1 according to AO) is selected, b) a Specimen 106 comprising or consisting of hand, lower arm, and upper arm is selected, c) a defined mass of 18.9 to 26.8 kg is adjusted, d) the Specimen 106 is aligned with Means to Secure Specimen 102, for example as described in Example 10, in a defined geometry in relation to the direction from which the defined mass impacts Specimen 106 when Holding Mechanism 114, 214 is released, e) the defined speed is adjusted with a drop height from 85 to 100 cm, f) the defined compression is adjusted from 24 to 38 mm, g) the defined damping is adjusted from 10 to 18 mm as the damped portion of the compression, h) Holding Mechanism 114, 214 is released, i) Specimen 106 is removed from Device 100, 200. The subject-matter of the invention is a Specimen 106 comprising a terrible triad (21 C1 according to AO), obtained by the aforementioned method for producing a terrible triad (21 C1 according to AO) in a Specimen 106.

Method for producing an olecranon fracture (21 B1, C1 according to AO) in a Specimen 106 using a Device 100, 200, characterized in that a) an olecranon fracture (21 B1, C1 according to AO) is selected, b) a Specimen 106 comprising or consisting of hand, lower arm, and upper arm is selected, c) a defined mass of 17.1 to 20 kg is adjusted, d) the Specimen 106 is aligned with Means to Secure Specimen 102, for example as described in Example 11, in a defined geometry in relation to the direction from which the defined mass impacts Specimen 106 when Holding Mechanism 114, 214 is released, e) the defined speed is adjusted with a drop height from 61 to 79 cm, f) the defined compression is adjusted from 4 to 17 mm, g) the defined damping is adjusted from 0 to 9 mm as the damped portion of the compression, h) Holding Mechanism 114, 214 is released, i) Specimen 106 is removed from Device 100, 200. The subject-matter of the invention is a Specimen 106 comprising an olecranon fracture (21 B1, C1 according to AO), obtained by the aforementioned method for producing an olecranon fracture (21 B1, C1 according to AO) in a Specimen 106.

Method for producing a Monteggia fracture (21 A1, B1 according to AO) in a Specimen 106 using a Device 100, 200, characterized in that a) a Monteggia fracture (21 A1, B1 according to AO) is selected, b) a Specimen 106 comprising or consisting of hand, lower arm, and upper arm is selected, c) a defined mass of 16.8 to 17.9 kg is adjusted, d) the Specimen 106 is aligned with Means to Secure Specimen 102, for example as described in Example 12, in a defined geometry in relation to the direction from which the defined mass impacts Specimen 106 when Holding Mechanism 114, 214 is released, e) the defined speed is adjusted with a drop height from 72 to 88 cm, f) the defined compression is adjusted from 28 to 46 mm, g) the defined damping is adjusted from 10 to 17 mm as the damped portion of the compression, h) Holding Mechanism 114, 214 is released, i) Specimen 106 is removed from Device 100, 200. The subject-matter of the invention is a Specimen 106 comprising a Monteggia fracture (21 A1, B1 according to AO), obtained by the aforementioned method for producing a Monteggia fracture (21 A1, B1 according to AO) in a Specimen 106.

Method for producing a Monteggia-like lesion (for example 21 B3 according to AO) in a Specimen 106 using a Device 100, 200, characterized in that a) a Monteggia-like lesion (for example 21 B3 according to AO) is selected, b) a Specimen 106 comprising or consisting of hand, lower arm, and upper arm is selected, c) a defined mass of 16.8 to 18.4 kg is adjusted, d) the Specimen 106 is aligned with Means to Secure Specimen 102, for example as described in Example 13, in a defined geometry in relation to the direction from which the defined mass impacts Specimen 106 when Holding Mechanism 114, 214 is released, e) the defined speed is adjusted with a drop height from 75 to 92 cm, f) the defined compression is adjusted from 30 to 46 mm, g) the defined damping is adjusted from 9 to 21 mm as the damped portion of the compression, h) Holding Mechanism 114, 214 is released, i) Specimen 106 is removed from Device 100, 200. The subject-matter of the invention is a Specimen 106 comprising a Monteggia-like lesion (for example 21 B3 according to AO), obtained by the aforementioned method for producing a Monteggia-like lesion (for example 21 B3 according to AO) in a Specimen 106.

Method for producing a Galeazzi fracture (for example 22 A3, B3, C1-C3 according to AO) in a Specimen 106 using a Device 100, 200, characterized in that a) a Galeazzi fracture (for example 22 A3, B3, C1-C3 according to AO) is selected, b) a Specimen 106 comprising or consisting of hand, lower arm, and upper arm is selected, c) a defined mass of 18.5 to 22.6 kg is adjusted, d) the Specimen 106 is aligned with Means to Secure Specimen 102, for example as described in Example 14, in a defined geometry in relation to the direction from which the defined mass impacts Specimen 106 when Holding Mechanism 114, 214 is released, e) the defined speed is adjusted with a drop height from 95 to 107 cm, f) the defined compression is adjusted from 24 to 39 mm, g) the defined damping is adjusted from 6 to 17 mm as the damped portion of the compression, h) Holding Mechanism 114, 214 is released, i) Specimen 106 is removed from Device 100, 200. The subject-matter of the invention is a Specimen 106 comprising a Galeazzi fracture (for example 22 A3, B3, C1-C3 according to AO), obtained by the aforementioned method for producing a Galeazzi fracture (for example 22 A3, B3, C1-C3 according to AO) in a Specimen 106.

Method for producing a capitulum fracture (for example 13 B3 according to AO) in a Specimen 106 using a Device 100, 200, characterized in that a) a capitulum fracture (for example 13 B3 according to AO) is selected, b) a Specimen 106 comprising or consisting of hand, lower arm, and upper arm is selected, c) a defined mass of 20.5 to 24.2 kg is adjusted, d) the Specimen 106 is aligned with Means to Secure Specimen 102, for example as described in Example 15, in a defined geometry in relation to the direction from which the defined mass impacts Specimen 106 when Holding Mechanism 114, 214 is released, e) the defined speed is adjusted with a drop height from 70 to 81 cm, f) the defined compression is adjusted from 14 to 22 mm, g) the defined damping is adjusted from 6 to 13 mm as the damped portion of the compression, h) Holding Mechanism 114, 214 is released, i) Specimen 106 is removed from Device 100, 200. The subject-matter of the invention is a Specimen 106 comprising a capitulum fracture (for example 13 B3 according to AO), obtained by the aforementioned method for producing a capitulum fracture (for example 13 B3 according to AO) in a Specimen 106.

Method for producing a distal humerus fracture (for example 13 B1, B2, C1-C3 according to AO) in a Specimen 106 using a Device 100, 200, characterized in that a) a distal humerus fracture (for example 13 B1, B2, C1-C3 according to AO) is selected, b) a Specimen 106 comprising or consisting of hand, lower arm, and upper arm is selected, c) a defined mass of 20.2 to 27.2 kg is adjusted, d) the Specimen 106 is aligned with Means to Secure Specimen 102, for example as described in Example 16, in a defined geometry in relation to the direction from which the defined mass impacts Specimen 106 when Holding Mechanism 114, 214 is released, e) the defined speed is adjusted with a drop height from 68 to 81 cm, f) the defined compression is adjusted from 26 to 37 mm, g) the defined damping is adjusted from 0 to 15 mm as the damped portion of the compression, h) Holding Mechanism 114, 214 is released, i) Specimen 106 is removed from Device 100, 200. The subject-matter of the invention is a Specimen 106 comprising a distal humerus fracture (for example 13 B1, B2, C1-C3 according to AO), obtained by the aforementioned method for producing a distal humerus fracture (for example 13 B1, B2, C1-C3 according to AO).

Method for producing a clavicle shaft fracture (for example Type A and B according to AO) in a Specimen 106 using a Device 100, 200, characterized in that a) a clavicle shaft fracture (for example Type A and B according to AO) is selected, b) a Specimen 106 comprising or consisting of humerus, scapula, clavicle, and sternum base is selected, c) a defined mass of 12.3 to 16.5 kg is adjusted, d) the Specimen 106 is aligned with Means to Secure Specimen 102, for example as described in Example 17, in a defined geometry in relation to the direction from which the defined mass impacts Specimen 106 when Holding Mechanism 114, 214 is released, e) the defined speed is adjusted with a drop height from 55 to 68 cm, f) the defined compression is adjusted from 4 to 12 mm, g) the defined damping is adjusted from 0 to 6 mm as the damped portion of the compression, h) Holding Mechanism 114, 214 is released, i) Specimen 106 is removed from Device 100, 200. The subject-matter of the invention is a Specimen 106 comprising a clavicle shaft fracture (for example Type A and B according to AO), obtained by the aforementioned method for producing a clavicle shaft fracture (for example Type A and B according to AO) in a Specimen 106.

Method for producing a lateral clavicle fracture (for example Type I and II in accordance with Neer (Neer C S $2^{nd}$ (163) Fracture of the distal clavicle with detachment of the coracoclavicular ligaments in adults, J Trauma 3:99-110; Neer C S $2^{nd}$ (1968) Fracture of the distal third of the clavicle. Clin Orthop Relat Res 58:43-50)) in a Specimen 106 using a Device 100, 200, characterized in that a) a lateral clavicle fracture (for example Type I and II in accordance with Neer) is selected, b) a Specimen 106 comprising or consisting of humerus, scapula, clavicle, and sternum base is selected, c) a defined mass of 10.3 to 21.9 kg is adjusted, d) the Specimen 106 is aligned with Means to Secure Specimen 102, for example as described in Example 18, in a defined geometry in relation to the direction from which the defined mass impacts Specimen 106 when Holding Mechanism 114, 214 is released, e) the defined speed is adjusted with a drop height from 57 to 76 cm, f) the defined compression is adjusted from 5 to 14 mm, g) the defined damping is adjusted from 0 to 7 mm as the damped portion of the compression, h) Holding Mechanism 114, 214 is released, i) Specimen 106 is removed from Device 100, 200. The subject-matter of the invention is a Specimen 106 comprising a clavicle fracture (for example Type I and II in accordance with Neer), obtained by the aforementioned method for producing a clavicle fracture (for example Type I and II in accordance with Neer) in a Specimen 106.

Method for producing a proximal humerus fracture (for example 11 B1, B3, C1-C3 according to AO) in a Specimen 106 using a Device 100, 200, characterized in that a) a proximal humerus fracture (for example 11 B1, B3, C1-C3 according to AO) is selected, b) a Specimen 106 comprising or consisting of humerus, scapula, clavicle, and sternum base is selected, c) a defined mass of 19.2 to 28.8 kg is adjusted, d) the Specimen 106 is aligned with Means to Secure Specimen 102, for example as described in Example 19, in a defined geometry in relation to the direction from which the defined mass impacts Specimen 106 when Holding Mechanism 114, 214 is released, e) the defined speed is adjusted with a drop height from 65 to 88 cm, f) the defined compression is adjusted from 29 to 40 mm, g) the defined damping is adjusted from 0 to 16 mm as the damped portion of the compression, h) Holding Mechanism 114, 214 is released, i) Specimen 106 is removed from Device 100, 200. The subject-matter of the invention is a Specimen 106 comprising a proximal humerus fracture (for example 11 B1, B3, C1-C3 according to AO), obtained by the aforementioned method for producing a proximal humerus fracture (for example 11 B1, B3, C1-C3 according to AO) in a Specimen 106.

Method for producing a distal femur fracture (for example 33 C1-C3 according to AO) in a Specimen 106 using a Device 100, 200, characterized in that a) a femur fracture (for example 33 C1-C3 according to AO) is selected, b) a Specimen 106 comprising or consisting of foot, lower leg, and thigh is selected, c) a defined mass of 26 to 38.7 kg is adjusted, d) the Specimen 106 is aligned with Means to Secure Specimen 102, for example as described in Example 20, in a defined geometry in relation to the direction from which the defined mass impacts Specimen 106 when Holding Mechanism 114, 214 is released, e) the defined speed is adjusted with a drop height from 99 to 116 cm, f) the defined compression is adjusted from 31 to 49 mm, g) the defined damping is adjusted from 0 to 37 mm as the damped portion of the compression, h) Holding Mechanism 114, 214 is released, i) Specimen 106 is removed from Device 100, 200.

The subject-matter of the invention is a Specimen 106 comprising a femur fracture (for example 33 C1-C3 according to AO), obtained by the aforementioned method for producing a femur fracture (for example 33 C1-C3 according to AO) in a Specimen 106.

Method for producing a tibia head fracture (for example 41 B1 according to AO), for example a proximal tibia head fracture in a Specimen 106 using a Device 100, 200, characterized in that a) a tibia head fracture (for example 41 B1 according to AO), for example a proximal tibia head fracture is selected, b) a Specimen 106 comprising or consisting of foot, lower leg, and thigh is selected, c) a defined mass of 26 to 31 kg is adjusted, d) the Specimen 106 is aligned with Means to Secure Specimen 102, for example as described in Example 21, in a defined geometry in relation to the direction from which the defined mass impacts Specimen 106 when Holding Mechanism 114, 214 is released, e) the defined speed is adjusted with a drop height from 96 to 112 cm, f) the defined compression is adjusted from 35 to 47 mm, g) the defined damping is adjusted from 10 to 13 mm as the damped portion of the compression, h) Holding Mechanism 114, 214 is released, i) Specimen 106 is removed from Device 100, 200. The subject-matter of the invention is a Specimen 106 comprising a tibia head fracture (for example 41 B1 according to AO), for example a proximal tibia head fracture, obtained by the aforementioned method for producing a tibia head fracture (for example 41 B1 according to AO) in a Specimen 106.

Method for producing a talus fracture (for example Type II, Type III in accordance with Hawkins (LELAND G. HAWKINS. J Bone Joint Surg Am, 1970 July; 52 (5): 991-1002)) in a Specimen 106 using a Device 100, 200, characterized in that a) a talus fracture (for example Type II, Type III in accordance with Hawkins) is selected, b) a Specimen 106 comprising or consisting of foot and lower leg is selected, c) a defined mass of 24.8 to 37.2 kg is adjusted, d) the Specimen 106 is aligned with Means to Secure Specimen 102, for example as described in Example 22, in a defined geometry in relation to the direction from which the defined mass impacts Specimen 106 when Holding Mechanism 114, 214 is released, e) the defined speed is adjusted with a drop height from 68 to 83 cm, f) the defined compression is adjusted from 26 to 48 mm, g) the defined damping is adjusted from 0 to 22 mm as the damped portion of the compression, h) Holding Mechanism 114, 214 is released, i) Specimen 106 is removed from Device 100, 200. The subject-matter of the invention is a Specimen 106 comprising a talus fracture (for example Type II, Type III in accordance with Hawkins), for example a proximal tibia head fracture, obtained by the aforementioned method for producing a talus fracture (for example Type II, Type III in accordance with Hawkins) in a Specimen 106.

Method for producing a pilon fracture (for example 43 B3-B4, C1-C3 according to AO) in a Specimen 106 using a Device 100, 200, characterized in that a) a pilon fracture (for example 43 B3-B4, C1-C3 according to AO) is selected, b) a Specimen 106 comprising or consisting of foot and lower leg is selected, c) a defined mass of 24.7 to 38.5 kg is adjusted, d) the Specimen 106 is aligned with Means to Secure Specimen 102, for example as described in Example 23, in a defined geometry in relation to the direction from which the defined mass impacts Specimen 106 when Holding Mechanism 114, 214 is released, e) the defined speed is adjusted with a drop height from 100 to 111 cm, f) the defined compression is adjusted from 30 to 51 mm, g) the defined damping is adjusted from 0 to 25 mm as the damped portion of the compression, h) Holding Mechanism 114, 214 is released, i) Specimen 106 is removed from Device 100, 200. The subject-matter of the invention is a Specimen 106 comprising a pilon fracture (for example 43 B3-B4, C1-C3 according to AO) obtained by the aforementioned method for producing a pilon fracture (for example 43 B3-B4, C1-C3 according to AO) in a Specimen 106.

Method for producing a calcaneus fracture (for example Type 2A, 2C, Type 3AB, 3AC in accordance with Sanders (Sanders R et al. (1993) Operative Treatment in 120 Displaced Intraarticular Calcaneal Fractures. Clin Orthopaedics 290 pp. 87-95)) in a Specimen 106 using a Device 100, 200, characterized in that a) a calcaneus fracture (for example Type 2A, 2C, Type 3AB, 3AC in accordance with Sanders) is selected, b) a Specimen 106 comprising or consisting of foot and lower leg is selected, c) a defined mass of 24.1 to 32.7 kg is adjusted, d) the Specimen 106 is aligned with Means to Secure Specimen 102, for example as described in Example 24, in a defined geometry in relation to the direction from which the defined mass impacts Specimen 106 when Holding Mechanism 114, 214 is released, e) the defined speed is adjusted with a drop height from 90 to 98 cm, f) the defined compression is adjusted from 25 to 43 mm, g) the defined damping is adjusted from 0 to 18 mm as the damped portion of the compression, h) Holding Mechanism 114, 214 is released, i) Specimen 106 is removed from Device 100, 200. The subject-matter of the invention is a Specimen 106 comprising a calcaneus fracture (for example Type 2A, 2C, Type 3AB, 3AC in accordance with Sanders) obtained by the aforementioned method for producing a calcaneus fracture (for example Type 2A, 2C, Type 3AB, 3AC in accordance with Sanders) in a Specimen 106.

Method for producing a distal radius fracture (for example Type 23 B3 according to AO) in a Specimen 106 using a Device 100, 200, characterized in that a) a distal radius fracture (for example Type 23 B3 according to AO) is selected, b) a Specimen 106 comprising or consisting of hand and lower arm is selected, c) a defined mass of 20 to 23 kg is adjusted, d) the Specimen 106 is aligned with Means to Secure Specimen 102 in a defined geometry in relation to the direction from which the defined mass impacts Specimen 106 when Holding Mechanism 114, 214 is released, e) the defined speed is adjusted with a drop height from 76 to 102 cm, f) the defined compression is adjusted from 25 to 36 mm, g) the defined damping is adjusted from 10 to 16 mm as the damped portion of the compression, h) Holding Mechanism 114, 214 is released, i) Specimen 106 is removed from Device 100, 200. The subject-matter of the invention is a Specimen 106 comprising a calcaneus fracture distal radius fracture (for example Type 23 B3 according to AO) obtained by the aforementioned method for producing a distal radius fracture (for example Type 23 B3 according to AO) in a Specimen 106.

Other bone fractures can be produced analogously.

When producing the defined fracture using the method according to the invention, the individuality of the specimens (anatomically, geometrically, biomechanically) can influence the defined parameters such as the defined mass, the defined speed, the defined compression, the defined damping and the defined geometry. A range/value range is therefore specified for these parameters. The described options for securing and/or clamping the specimen in Device 100, 200 and the adjustment of technical parameters in Device 100, 200 result in overlaps for employed fractures, e.g. distal radius fracture extension and distal radius extension. This means that e.g. that a distal radius fracture of classification 23 A2 (dorsal) according to AO and a distal radius fracture of classification 23 C1-C3 (dorsal) according to AO require the same clamping arrangement. Since the various defined bone fractures partially only have minimal differences with respect to the fracture profile or the introduction of force during an actual accident, the adjustments on Device 100, 200 for producing the defined bone fractures also have only minimal differences. When setting the defined parameters and the clamping arrangement of Specimen 106, these cases must take into account the individuality of the individual Specimen 106 as recognized by the person trained in the art.

The following describes the procedures for adjusting the method according to the invention to produce a newly selected defined bone fracture with accompanying soft tissue injuries. Since it is essentially impossible to realistically retroactively simulate an accident sequence (e.g. a motorcycle accident) and to simulate reality by employing a complete human body as Specimen 106 for this purpose, the retroactive simulation of reality must rely on the method according to the invention by exerting the required forces, speeds on a Specimen 106, e.g. by using Device 100, 200. Device 100, 200 always works based on the same principle when doing so, whereas the injuries and accidents underlying the defined bone fractures always differ. For every new bone fracture, Specimen 106 is secured in Device 100, 200 in the defined geometry in relation to the direction from which the defined mass impacts Specimen 106 when Holding Mechanism 114, 214 is released, where appropriate, by using adapters that facilitate the clamping arrangement in the defined geometry.

The defined compression of Specimens 106 depends on the anatomic region and the selected bone fracture. The person trained in the art can determine the defined compression depending on the selected defined bone fracture and Specimen 106. The defined damping depends on the anatomic region of Specimen 106 and the selected defined bone fracture. The person trained in the art can determine the defined damping depending on the selected defined bone fracture and Specimen 106. The defined compression and damping prevent that excessive loads are placed on Specimen 106 and that the anatomic structures (e.g. bones and soft tissue) in Specimen 106 are unrealistically destroyed. The defined speed of the defined mass is the speed that the defined mass is intended to have reached at the time of the force impact, e.g. at the moment in time the defined mass impacts Specimen 106 and/or upon impact with Die Punch 111, 211 when a Device 100, 200 is used. Said speed depends on the selected defined bone fracture and on the forces acting during the underlying accident sequence. The person trained in the art can determine the defined speed depending on the selected defined bone fracture, the defined mass, and Specimen 106.

In order to optimize adjustments of the clamping arrangements for specimens and the settings on Device 100, 200 to the circumstances of the particular Specimen 106, individual specimens can be examined before executing the method for producing a defined bone fracture with Specimen 106, for example by taking and examining X-ray and CT scans, by performing mechanical and/or orthopedic function tests (e.g. manually) on the joint or joints. As a result, deficiencies or anatomic peculiarities in individual specimens can be taken into account, such as the weight of Specimen 106, the fat content of the soft tissue mass, the length, width, and diameters of affected bones, the joint spacing, the maximum joint angles, the bone quality, and degenerative disorders. Degenerative disorders include without limitation the formation of osteophytes, joint instabilities, osteoarthrosis, and most importantly osteoporosis. If a Specimen 106 is affected by such restrictions, the bone fractures can be produced only conditionally, or not at all. For example, bone density measurements can be taken on specimens. Accordingly, when producing a defined bone fracture in an "old" Specimen 106 (e.g. 90 years of age, female, mild osteoporosis, minor restrictions in joint movement) the settings of the defined parameters and the defined geometry and clamping arrangement on Device 100, 200 will be slightly different than for a "young" Specimen 106 (e.g. 60 years of age, male, no further restrictions). The methods and procedures for determining the quality of a Specimen 106 are known to the person trained in the art. In particular, the person trained in the art can also assess and appropriately take into account the quality of specimens without accurate measurements based on age, stature, nutritional habits, gender, etc.

The procedure for determining the defined parameters for a newly selected bone fracture with accompanying soft tissue injuries comprises several steps i.) to xi.), which can be performed sequentially, in parallel, and in variable order (steps iii.) to xi.)).

The procedure for determining the defined parameters comprises the following steps i. Select a newly defined bone fracture;

ii. Analyze at least one eyewitness account, patient report, image, video, or document concerning the producing of the defined bone fracture on at least one accident victim;

iii. Based on i.) and ii.) determine the speed, direction of motion, and joint alignment in the anatomic region in relation to the acting direction of force during the production of the defined bone fracture;

iv. Theoretically determine the mass of the accident victim and calculate the mass inertia and direction of movement of the accident victim;

v. Map the injury to a fracture class, for example according to AO Trauma Register;

vi. Develop at least one theory for reproducibly producing the defined bone fracture in a Specimen 106;

vii. Calculate the energy range for producing the defined bone fracture in a Specimen 106 and determine the defined mass and the defined speed of the defined mass;

viii. Select a defined anatomic region for Specimen 106;

ix. Determine the axis symmetry of Specimen 106 in relation to the acting force vector upon impact of the defined mass and determine the defined geometry for clamping Specimen 106 in relation to the axially, preferably vertically guided mass, for example by adjusting the internal coordinate system of Specimen 106 to the external coordinate system of a Device 100, 200 to retroactively simulate an actual accident sequence;

x. Calculate the defined compression to which Specimen 106 can be exposed upon impact of the defined mass;

xi. Calculate the defined damping upon impact of the defined mass onto Specimen 106, wherein the order of the steps is variable.

Adjusting the method according to the invention for reproducibly producing a newly defined bone fracture with accompanying soft tissue injuries is a three-step process:

In a first step, a defined bone fracture is selected from the conventional fracture classifications (e.g. AO) to be produced in specimens, followed by an analysis of the defined bone fracture for the underlying injury sequence, followed by determining the physical parameters and the biomechanical parameters (e.g. research, databases, German trauma register). The analysis for how the bone fracture occurred in actual accident sequences is for example performed based on eyewitness accounts and/or patient reports, the analysis of images and/or videos. The physical parameters to be determined include speed, e.g. the speed at which a body or a person, preferably the accident victim, moves, the direction of motion of individual body segments (e.g. a foot, a lower leg), the mass of such a segment, a body, or a person, in particular the mass of the accident victim and the energy resulting during an accident. The biomechanical parameters to be determined include the behavior of the biological material during the accident underlying the bone fracture, such as the joint angles of the affected anatomic region (e.g. the upper extremity), the mass inertia of the moving body (generally the body of the accident victim), the direction of movement of the body during the accident and fracture classifications. The joint alignments can for example be determined by analyzing video recordings, literature research, biomechanical studies concerning sport technology and sports injuries, or ergonomic studies.

A theory concerning the injury mechanism is developed in a second step. This theory is verified based on biomechanical calculations and model simulations, for example kinematic model calculations for determining speeds, accelerations, positions, and joint angles, inverse dynamic calculations of acting forces and reactive forces, as well as the moments acting on the ossuary and ligament structures of the specimens. The calculated defined parameters, specifically the calculated defined mass, the calculated defined direction, the calculated defined speed of calculated defined mass on impact, the calculated defined geometry of Specimen 106 in relation to the calculated force impact on impact, the calculated defined compression of Specimen 106, the calculated defined damping on impact, are validated with model calculations. This involves applying the methods of applied biomechanics (e.g. anthropometry, kinematics, dynamics, kinetics), locomotive analysis, dynanometrics, and kinemetrics. The person trained in the art is familiar with these model calculations, e.g. from Georg Kassat, Biomechanics for Non-Biomechanics, Fitness-Contour-Verl., Bünde 1993; David A. Winter, Biomechanics and Motor Control of Human Movement, 4$^{th}$ edition Wiley, J, New York, NY 2009; Benno Kummer: Biomechanics Dt. Ärzte-Verl., Cologne 2004.

The defined bone fracture can of course occur in a number of ways. According to the invention, the defined bone fracture is produced pursuant to the method according to the invention, preferably by using a Device 100, 200. This means that the data and results of the calculations from Step One and Two are translated into the operating principle of the method according to the invention. The method according to the invention is characterized in that a defined bone fracture can be produced with minimal harm on Specimen 106 and with little apparatus effort. As a result, the defined bone fracture can be produced faster and with high probability. For a preferred embodiment, the theoretical calculation therefore comprises the transfer of the calculated parameters for producing the defined bone fracture in a Specimen 106 using a Device 100, 200. A device 100, 200 produces the defined bone fracture in Specimen 106 with the force impact of a gravitationally accelerated mass. By specifying the defined direction from which the defined mass impacts Specimen 106, the defined geometry by which Specimen 106 must be aligned in Device 100, 200 is mandated by biomechanical parameters.

In the third step, the method according to the invention is executed by employing the calculated defined parameters on specimens. In order to work economically and ethically responsibly with specimens, in particular human specimens, which represent human body donations, the objective is to achieve high reproducibility when producing the defined bone fracture with accompanying soft tissue injuries. Establishing reproducibility comprises that the defined parameters result in producing the defined bone fracture with accompanying soft tissue injuries independently of the respective individual properties of Specimen 106. This means that a defined bone fracture is produced with a probability (accuracy rate) of at least 50%, preferably at least 60%. Whether the produced bone fractures correspond to the selected defined is for example verified with X-ray images or CT scans that are inspected and evaluated by experienced accident surgeons and are mapped against commonly used fracture classifications (without limitation, AO). If the images and subsequently the bone fractures are classified as matching, e.g. realistic, the focus is placed on reproducibility in order to achieve the desired probability (accuracy rate) of at least 50%, 60%, 70%, 80%, or greater. A total of 300 simulations are required to reproduce all relevant fractures of an anatomic region (that comprises 1 joint) with a minimum probability (accuracy rate) of 60%. The method according to the invention is preferably performed on Specimens 106, 506 using Devices according to the invention 100, 200, 500, 600. Depending on the selected defined bone fracture, this involves exposing the biological structures in Specimens 106, 506 to high-energy impulses and/or shear forces and bending moments. Dynamometrics are employed to measure the acting force and the movements of the individual segments of Specimen 106 are recorded in videos. The collected data are analyzed and evaluated. The procedure is for example known from Dieter Fink (2013) (Master Thesis: "Conceptual design and implementation of a software package for synchronizing, data recording, and metrology signal rendering for the Essex-Lopresti simulator"), Marc Ebinger (2013) (Master Thesis "Design and evaluation of a novel simulator for high-speed injuries of the human forearm"), Robert Holz (2013) Master Thesis "The Mechanism of Essex-Lopresti: Investigation of tissue failure using a newly developed simulator"). For each defined bone fracture, this procedure is employed to determine a dedicated combination of technical parameters (settings on Device 100, 200), biomechanical parameters (alignment of Specimen 106 in the defined geometry in relation to the direction from which the defined mass impacts Specimen 106 and securing Specimen 106 in this geometry). These parameters are discussed in the examples for producing various defined bone fractures.

Producing a defined bone fracture with accompanying soft tissue injuries pursuant to the method according to the invention, for example when verifying the calculated parameters, when establishing the method, or when using the method for reproducible production comprises the following steps: defrosting Specimen 106 as needed, potting the severed base as needed, aligning and clamping Specimen 106 into Device 100, 200, adjusting the defined parameters, releasing Holding Mechanism 114, 214, verifying and documenting the results as needed.

TABLE 1

Reproducibly (e.g. having a probability of in this case of at least 50% or greater) producible defined bone fractures with accompanying soft tissue injuries in human specimens.

| Anatomic Region | Example No. | Fracture | Status |
|---|---|---|---|
| Hand/Finger | 1 | Phalanges | Reproducible 86% |
| | 2 | Metacarpals | Reproducible 79% |
| Wrist | 3 | Extension (Smith) | Reproducible 90% |
| | 4 | Flexion (Coles) | Reproducible 86% |
| | 5 | Die Punch | Reproducible 69% |
| | 6 | Chauffeur | Reproducible 75% |
| | 7 | Scaphoid | Reproducible 60% |
| Elbow | 8 | Radius Head | Reproducible 79% |
| | 9 | Coronoid | Reproducible 90% |
| | 10 | Terrible Triad | Reproducible 92% |
| | 11 | Olecranon | Reproducible 94% |
| | 12 | Monteggia | Reproducible 60% |
| | 13 | Monteggia-Like Lesion | Reproducible 66% |
| | 14 | Galeazzi | Reproducible 53% |
| | 15 | Capitulum | Reproducible 72% |
| | 16 | Distal Humerus | Reproducible 79% |
| Shoulder | 17 | Clavicle Shaft | Reproducible 70% |
| | 18 | Lateral Clavicle | Reproducible 52% |
| | 19 | Proximal Humerus | Reproducible 76% |
| Knee | 20 | Distal Femur | |
| | 21 | Tibia Head | Reproducible 72% |
| Ankle | 22 | Talus | |
| | 23 | Pilon | Reproducible 62% |
| | 24 | Calcaneus | Reproducible 61% |

TABLE 2

Examples for defined parameters for producing defined bone fractures (Def. = defined)

| No. | Defined bone fracture | Classification pursuant to AO Trauma Register | Def. Mass in kg | Def. Fall Height in cm | Defined Compression in mm | Defined Damping in mm | Energy in Joule |
|---|---|---|---|---|---|---|---|
| 1 | Shaft fracture of the phalanges I-V | 78 A2, B2, C2 | 5.2 to 9.8 | 29 to 46 | 2 to 8 | 0 to 5 | 15 to 44 |
| 2 | Shaft fractures of the metacarpals I-V | 77 A2, B2, C2 | 7 to 11.2 | 35 to 52 | 6 to 14 | 0 to 9 | 24 to 57 |
| 3 | Distal radius fracture extension | 23 A2, 23 C1-C3 (dorsal) | 16.8 to 19.3 | 76 to 102 | 22 to 30 | 6 to 14 | 125 to 193 |
| 4 | Distal radius fracture flexion | 23 A2, (palmar) | 16.8 to 20.5 | 82 to 105 | 25 to 35 | 5 to 17 | 135 to 211 |
| 5 | Distal radius fracture/die-punch fracture | 23 C1-C2 | 17 to 23.1 | 90 to 110 | 22 to 31 | 9 to 15 | 150 to 249 |
| 6 | Distal radius fracture/chauffeur's fracture | 23 B1 | 16.6 to 18.3 | 80 to 93 | 20 to 28 | 6 to 14 | 130 to 167 |
| 7 | Scaphoid fracture | 72 A2, B2-B3 | 16.8 to 19.5 | 75 to 88 | 24 to 32 | 10 to 17 | 124 to 168 |
| 8 | Radius head fracture | 21 B2 (Type I-III iaw. Mason) | 18.3 to 21.5 | 75 to 88 | 21 to 29 | 9 to 15 | 135 to 168 |
| 9 | Coronoid fracture | 21 B1 (Regan & Morrey Type I-III) | 18.2 to 22.8 | 75 to 86 | 20 to 33 | 8 to 16 | 134 to 192 |
| 10 | Terrible triad | 21 C1 | 18.9 to 26.8 | 85 to 100 | 24 to 38 | 10 to 18 | 158 to 289 |
| 11 | Olecranon fracture | 21 B1, C1 | 17.1 to 20.0 | 61 to 79 | 4 to 17 | 0 to 9 | 116 to 139 |
| 12 | Monteggia fracture | 21 A1, B1 | 16.8 to 17.9 | 72 to 88 | 28 to 46 | 10 to 17 | 119 to 155 |
| 13 | Monteggia-like lesion | 21 B3 | 16.8 to 18.4 | 75 to 92 | 30 to 46 | 9 to 21 | 124 to 166 |
| 14 | Galeazzi fracture | 22 A3, B3, C1-C3 | 18.5 to 22.6 | 95 to 107 | 24 to 39 | 6 to 17 | 172 to 237 |
| 15 | Capitulum fracture | 13 B3 | 20.5 to 24.2 | 70 to 81 | 14 to 22 | 6 to 13 | 141 to 192 |
| 16 | Distal humerus fracture | 13 B1, B2, C1-C3 | 20.2 to 27.2 | 68 to 81 | 26 to 37 | 0 to 15 | 135 to 216 |
| 17 | Clavicle shaft fracture | Type A and B | 12.3 to 16.5 | 55 to 68 | 4 to 12 | 0 to 6 | 66 to 110 |
| 18 | Lateral clavicle fracture | Type I and II iaw. Neer | 10.3 to 21.9 | 57 to 76 | 5 to 14 | 0 to 7 | 58 to 163 |
| 19 | Proximal humerus fracture | 11B1, B3, C1-C3 | 19.2 to 28.8 | 65 to 88 | 29 to 44 | 0 to 16 | 122 to 249 |
| 20 | Distal femur fracture | 33 C1-C3 | 26.0 to 38.7 | 99 to 116 | 31 to 40 | 0 to 37 | 253 to 440 |
| 21 | Tibia head fracture | 41 B1 | 26 to 31 | 96 to 112 | 35 to 47 | 10 to 13 | 245 to 341 |
| 22 | Talus fracture | Type II, Type III iaw. Hawkins | 24.8 to 37.2 | 68 to 83 | 26 to 48 | 0 to 22 | 165 to 303 |
| 23 | Pilon fracture | 43 B3-B4, C1-C3 | 24.7 to 38.5 | 100 to 111 | 30 to 51 | 0 to 25 | 242 to 419 |
| 24 | Calcaneus fracture | Type 2A, 2C, Type 3AB, 3AC iaw. Sanders | 24.1 to 32.7 | 90 to 98 | 25 to 43 | 0 to 18 | 213 to 314 |
| 25 | Distal radius fracture | 23 B3 | 20 to 23 | 76 to 102 | 25 to 36 | 10 to 16 | 149 to 230 |

The defined damping can be equal to zero, e.g. the impact is undamped. When producing a capitulum fracture, Galeazzi fracture, or Monteggia fracture in specimens, the defined damping cannot be set to zero since the biological structures are otherwise damaged in an uncontrolled manner.

The subject-matter of the invention is also the use of specimens according to the invention or the method according to the invention or the commercial Device according to the invention 200 for training or continuing education of medical staff, clinics, and doctors, in particular from the orthopedic and accident surgical fields, in particular surgeons.

Another application for specimens according to the invention or the method according to the invention or the commercial Device according to the invention 200 include the manufacturers of articles and equipment for accident surgery and orthopedics. This industrial branch comprises all manufacturers of implants for replacing joints (e.g. artificial hip or knee joint) and for treatment of fractures (osteosynthesis).

Specimens according to the invention or the method according to the invention or the commercial Device according to the invention 200 are also employed by the consumer goods industry (e.g. automobile industry, exercise equipment manufacturers), for accident research and accident analysis, for catastrophe protection, for military training, and for preparing expert opinions.

Devices 100, 200, 500, Drive Module 329, 229 in combination with Test Module 430, 230 that are suited for executing the method according to the invention.

Simple versions are known to the prior art, for example from McGinley et al. (2003), Robert Holz (2013) (Master Thesis "The Mechanism of Essex-Lopresti: Investigation of tissue failure using a newly developed simulator"), Marc Ebinger (2013) (Master Thesis "Design and evaluation of a novel simulator for high-speed injuries of the human forearm"), and Dieter Fink (2013) (Master Thesis: "Conceptual design and implementation of a software package for synchronizing, data recording, and metrology signal rendering for the Essex-Lopresti simulator").

Building on these, two different Devices 100, 200, 500 were developed. A scientific prototype for Device 100, 500 for determining and validating the defined parameters so that the defined bone fracture can be reproducibly produced in a Specimen 106. This scientific prototype comprises implemented metrology, software-controlled metrology synchronization, solid construction for reliable and valid data recording, mechanical safety system (electrically assisted). At least 2 persons are required to operate Device 100, 500.

Secondly, a Device 200, Drive Module 329, 229 in combination with Test Module 430, 230 for commercial use, characterized in that Device 100, 200 does not comprise metrology (for faster, more efficient operation) and comprises a lighter-weight construction, is transportable and quickly assembled and disassembled, has at least one electrical safety system that is mechanically assisted, and in that only at least 1 person is needed for operation.

In contrast to the device by McGinley et al., Devices 100, 200 can be adjusted variably and are as a result suited for producing various defined bone fractures. The device by McGinley has a fixed kinetic energy of 239 J upon impact, disregarding air and gliding friction.

Device 100, 200 can be adjusted such that the speed upon impact of the defined mass on Specimen 106 is 4.2 m/s or greater and the energy upon impact is 240 J or greater. The technical parameters that can be adjusted on Device 100, 200 include the defined mass, here: the mass of the falling body, which is adjustable from 11.8 to 62.9 kg, the defined speed, here: the height of the falling body, adjustable from 0 to 1100 mm, the defined compression, here: the path (travel path) allowance for Specimen 106 to move in the direction of the acting force, and the defined damping, here: the point in time at which the impact dampers remove the (residual) energy from the system.

The mechanical requirements for Device 100, 200. The energy, the speed, and the resulting acceleration can be calculated from the parameters of the defined mass, the time required until impact, and the drop height. Furthermore, the accompanying impulse, and, based on the latter, the kinetic energy and the force can be calculated based on the impulse theorem (theoretically). The results of such calculations can in turn be compared with the preliminary calculations for executing the method for producing a defined bone fracture with accompanying soft tissue injuries (see procedure for adjusting the method according to the invention for producing a newly selected defined bone fracture with accompanying soft tissue injuries). Said results are also used for comparison with actually measured forces and speeds while executing the method. The securing and clamping arrangement of specimens can be adjusted in Device 100, 200 to anatomic circumstances, and is at the same time stable. Adjustment options available that allow the various specimens to be centrally positioned under the point of attack of the force in Device 100, 200 while executing the method. Moreover, the proximal and distal clamping of Specimen 106 can be separately rotated in Device 100, 200 in order to specify a pronation for Specimen 106. Device 100, 200 also comprises safety devices that guarantee safe operations on and with Device 100, 200.

Device 500, 600 can comprise metrology. In order to analyze the injury mechanism, the deformations of biological structures and the chronological sequence of the occurring injuries are of significance. For example, an optical method can be used to record and subsequently analyze these while executing the method. However, other high-resolution methods can also be employed. An optical method must generate a frequency of 1000 Hz or greater in order to record a sufficient number of analyzable images over the short time the force is exerted (≤5 ms). In order to have the ability to make statements about the defined speed, here: the amount of the force acting on the specimens, the latter is measured directly while the method is executed. According to the video analysis, the impact force should be recorded with a minimum frequency of 2000 Hz in order to fulfill the scanning theorem pursuant to Shannon and Nyquist (Harry Nyquist: Certain Topics in Telegraph Transmission Theory. In: Transactions of the American Institute of Electrical Engineers. Vol. 47, 1928; Michael Unser: Sampling—50 Years after Shannon. In: Proceedings of the IEEE. Vol. 88, No. 4, 2000, pp. 569-587).

Device 100, 200 employs a gravitationally accelerated falling body as defined mass. The adjustable drop height is used to always exert the same impact speed on specimens of varying lengths. The variable mass of the falling body is used to generate the calculated force and energy on impact of the defined mass onto specimens of varying lengths.

A special embodiment of Device 100, 200 has a solid Base Plate 101, 201 with dimensions 75 mm×75 mm×5 mm and a weight of approx. 220 kg with two guide columns inserted therein and two crossmembers arranged between the guide columns. Device 100, 200 has a height of 280 cm and is surrounded from the outside by an Enclosure 227 made of aluminum profiles and macralon plates. The upper Crossmember 115, 215 stabilizes the Guide Columns 118, 218. The vertically stably guided falling body of Device 100, 200 comprises a Mass 112, 212 and one or several Add-On Weights 113, 213 for adjusting the defined mass. The defined mass is held at the release height by an electro-magnet (Kendrion GmbH, Donaueschingen), which represents the Holding Mechanism 114, 214 of Device 100, 200. During the vertical drop, the defined mass glides nearly friction-free and gravitationally accelerated in the direction of Specimen 106. The height of the falling body is variable and can be adjusted from 50 to 110 cm using an Adjustment Rod 117. The mass can also be increased with Add-On Weights 113, 213 from 11.8 kg (empty weight) to 27 kg. A Crossmember 109, 209 that either is or is not height-adjustable is located thereunder. A height-adjustable crossmember can be adjusted to the length of Specimens 106. Crossmember 109, 209 is used as an upper clamp (alignment in a defined geometry and clamping) of Specimens 106 and comprises an axially guided Die Punch 111, 210 with a friction-free guide mechanism The latter transfers the impulse of the falling body onto Specimen 106. Crossmember 109, 209 can comprise one or several Force Sensors 103, preferably 3 Force Sensors (Type 9011A Kistler, Winterthur, Switzerland) that measure the force exerted upon impact of the falling body onto Die Punch 111, 211 (and therefore onto Specimen 106). In order to still catch the falling body during impact, a Means for Damping 110, 210, preferably impact dampers, preferably two industrial shock absorbers (ACE SCS33-25EU, ACE Stoßdämpfer GmbH, Langenfeld), is arranged in the crossmember. These two shock absorbers can together absorb a maximum energy of 310 J over a deceleration path of 2.6 mm and are also height-adjustable (65 mm). Based on this adjustment option, the impact of the defined mass onto Specimen 106 can either be damped or undamped.

A Base Plate 101, 201 is located below Crossmember 109, 209 as a bottom clamp for Specimens 106. Base Plate 101, 201 comprises a Means to Secure Specimen 106, for example a carriage that can be laterally shifted on the base plate, and, where required, a Mold 105 affixed thereupon, for example a potting cup. Where required, one or several Force Sensors 103 (e.g. Type Kistler, Winterthur, Switzerland) can be clamped between Mold 105 of the Means to Secure Specimen 106. Using the upper and lower clamping options, Specimens 106 can be secured in Device 100, 200 in various defined geometries and to preferably position these centrally under Die Punch 111, 211. These can also be used to give Specimen 106 a defined joint alignment, for example a pronation or supination.

Adjustment Rod 117 in Device 100 is used as a height adjustment for setting the drop height. The height adjustment can also be achieved by other means, for example with a rope pulley, electrical rope winch, or a pin setting system.

A preferred embodiment of Device 200 places the focus on cost efficiencies, ruggedness, and transportability of Device 200. This Device 200 is preferably used to reproducibly produce bone fractures in specimens for customer orders. This Device 200 therefore preferably is not equipped with metrology. The Device 200 therefore supports faster and more effective operation. The components are preferably made of steel alloys and are no longer made of aluminum in order to extend the service life of the material and to reduce wear over an extended operating time. A commercial Device 200 preferably comprises at least two modules that can be separated for easier transportation. Specimens 106 are clamped into the lower Module 400 (working module). Module 400 is aligned such that all adaptors and other auxiliary materials can be used for clamping the Specimens 106 in a defined geometry to align Specimen 106 in the defined geometry. The workspace dimensions are increased in all three directions in order to speed up the work. The upper Module 300 (drive module) was expanded by several components. The reason for this is to improve the cost-efficiency of Device 200 and to increase the occupational safety of Device 200. A falling body is held magnetically on 2 approx. 2 m long, vertically standing Guide Columns 218. When released, said falling body glides along the Guide Columns 218 up to the Die Punch 211. One person can adjust the drop height and the defined mass unassisted. For this purpose, Holding Mechanism 214 for the defined mass is controlled in a manner to prevent Holding Mechanism 214 from being released unintentionally, for example by programming the electrically controlled holding mechanism of 2 magnets such that these are permanently magnetic and therefore hold the weight of the defined mass. The magnets release the connection to the defined mass (the falling body) only when said magnets receive the electrical command controlled by a safety lock. An electrical power failure or another technical malfunction can therefore not disable the Holding Mechanism 214. While work is performed on the Process and/or Drive Module 329, 299, 400, the falling body is additionally secured with locking pins that are only removed immediately prior to the drop. The (free) fall of the falling body is released by an electrical signal to the magnets. The falling body is lifted back up by lowering a Crossmember 215, 315 within Drive Module 300 along the Guide Columns 218, 318, said crossmember forming a connection with the falling body using the magnet system described above. A Pulley 225 then raises the combined elements. The release of Mass 212, 312 is also triggered by a button push of Safety Switch 226, 326 of the same type and cannot be affected by an electrical power failure or miscellaneous technical malfunction. The Mass 212, 312 is also secured by safety pins that are inserted into Holes 221, 321.

A further exemplary embodiment of Device 200 comprises a Test Module 430, 230 and a Drive Module 329, 229. This device is specifically designed for commercial use since both modules can be easily separated, transported, and reassembled as Device 200. The entire Device 200 has a height of 315 cm.

Test Module 430, 230 comprises a Base Plate 401 (e.g. the 70 cm×82 cm) into which two Support Pillars 419 are installed, for example with a spacing of 54 cm. The Support Pillars 419 have a minimum height of 50 cm, preferably 110 cm and support Crossmember 409 with the integrated Die Punch 411. Various clamping devices or adapters can be arranged on the bottom side of Die Punch 411. Crossmember 409 is height-adjustable or not height-adjustable in Test Module 430, 230. The height of Crossmember 409 is preferably not adjustable, so that the working height is held constant and the Base Plate 401 on which Specimen 106 is placed is adjusted to the height of Die Punch 411. This adjustment is for example made with platforms (e.g. with a surface of 40×40 cm) having different heights that can be secured with screws in the base plate using Holes 402. Where required, one or several means for adjusting the damping, for example two shock dampers, are installed in Crossmember 409.

The force impact in Drive Module 329, 299 is produced based on the same technology as in Device 100. Drive Module 329, 299 comprises at least one Guide Column 318, preferably two e.g. 190 cm long Guide Columns 318. The Guide Columns 318 can have Holes 321, for example with a spacing of 3 cm. These Holes 321 are used to accommodate the locking pins and securely position the defined mass. The Mass 321 and at least two additional Crossmembers 315 and 324 travel on the Guide Columns 318. The Mass 318 has a deadweight of e.g. 18 kg and can be adjusted with Add-On Weights 313 to a defined mass, e.g. a defined maximum mass of 72 kg.

The drive module preferably comprises safety mechanisms for avoiding accidents when executing the method according to the invention. The following not-limited examples for corresponding safety mechanisms can be a part of Drive Module 300, either individually or in combination.

The Mass 318 accommodates at least two Holding Mechanisms 314, e.g. two docking plates onto which permanent magnets can dock on the underside of Crossmember 315. The permanent magnets fit onto the docking plate of the falling mass.

Crossmember 315 can be moved e.g. with a Rope Pulley 225 (having e.g. 3 pulleys). Crossmember 315 is used to safely lift the falling mass back up after the method is executed. Once the magnets have docked onto the falling mass, the falling mass can be raised with the connected Crossmember 315 using the Rope Pulley 225.

A pin of an electrical signal encoder and two further docking plates can be located on the upper side of Crossmember 315. When Crossmember 315 is raised until under Crossmember 324 (the mating entry point for Pin 323 is located there), Pin 322 on Crossmember 315 engages with the entry point for Pin 323 on the underside of Crossmember 324. This closes an electrical lock. At the same time, the docking plates of Crossmember 315 form a connection with the permanent magnets of Crossmember 324. This securely connects together Crossmember 324 and Crossmember 315 and the falling mass. Crossmember 324 is used to hold this assembly and to control the drop height. Crossmember 324 and 7 or Crossmember 315 is held with safety pins in Guide Columns 318. The drop height is adjusted by removing the safety pins. A safety can also be installed below the falling mass with safety pins in Holes 321 of Guide Column 318.

In order to release the falling mass to execute the method, the polarity of the permanent magnets on Crossmember 315 and 324 must be reversed. This is accomplished with an electrical signal. This means that the magnets only release the falling mass when current flows. The falling mass cannot drop if Device 200 is disconnected from the electricity supply. The electrical signal that releases the free fall of the mass is generated by an Electrical Switch 226, 326 on the exterior of Drive Module 300.

Safety Switch 226, 326 must be triggered manually using a key and additionally by pushing a button. The signal generated by Safety Switch 226, 326 can only be triggered when Crossmember 315 and 324 have properly connected with the falling mass via the plug-in Signal Encoder 322 and 323.

Both the Test Module as well as the Drive Module 329, 229, 400 are enclosed by an opaque Enclosure 227, 327, 427 (e.g. sheetmetal enclosure). The enclosure can for instance be macrolon plates and/or sheetmetal enclosures. These prevent a person from reaching into Device 200 and sustaining an injury while the method according to the invention is executed.

A Device 500, 600 according to the invention with metrology is used to validate the theoretically calculated defined geometry of Specimen 106 in relation to the defined direction from which the defined mass impacts Specimen 106, to validate the theoretically calculated defined compression of Specimen 106 upon impact of the defined mass, to validate the theoretically calculated defined damping upon impact of the defined mass, to validate the theoretically calculated defined speed of the defined mass. Corresponding metrology can be used to improve the accuracy rate for producing the defined bone fracture. The test setup and analysis are known from Robert Holz (2013) (Master Thesis "The Mechanism of Essex-Lopresti: Investigation of tissue failure using a newly developed simulator"), Marc Ebinger (2013) (Master Thesis "Design and evaluation of a novel simulator for high-speed injuries of the human forearm"), and Dieter Fink (2013) (Master Thesis: "Conceptual design and implementation of a software package for synchronizing, data recording, and metrology signal rendering for the Essex-Lopresti simulator").

The Figures are used to describe devices according to the invention suited for executing the method according to the invention and for producing the specimens according to the invention.

FIG. 1: Device 100 comprising Base Plate 101, Means to Secure Specimen 102, Force Sensor 103, Specimen 106, Clamping Plate 107, Ball Bearing 108, Crossmember 109 with Die Punch 111, Means for Adjusting the Damping 110, Mass 112 and Add-On Weight 113, Holding Mechanism 114, Crossmember 115, Roof 116, Adjustment Rod 117, Guide Column 118.

Figure 2B:
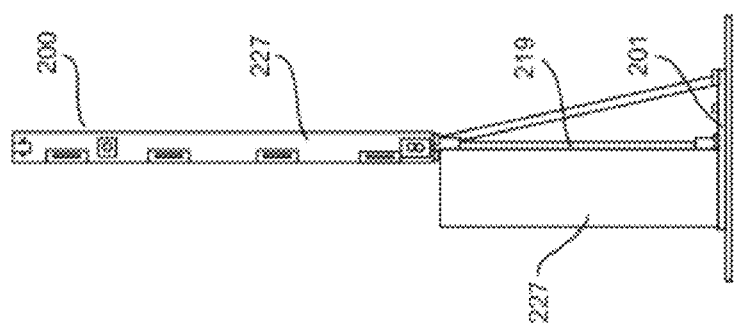
Figure 2A:
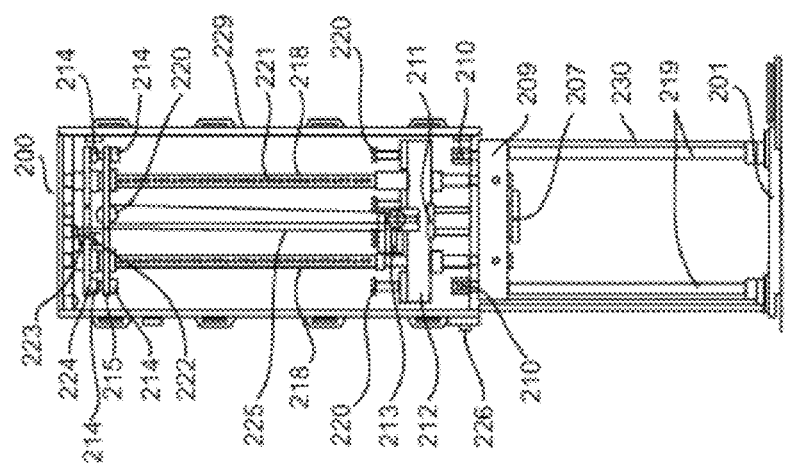

FIG. 2: Device 200 comprising Drive Module 229 and Test Module 230, Base Plate 201, Clamping Plate 207, Crossmember 209 with Die Punch 211, Means for Adjusting the Damping 210, Mass 212, Add-On Weight 213, Holding Mechanism 214, Crossmember 215, Roof 216, Guide Column 218, Carrier Column 219, Docking Plate 220, Hole 221, Pin for Signal Encoder 222, Entry Point for Pin 223, Crossmember 224, Pulley 225, Safety Switch 226, Enclosure 227.

Figure 3:
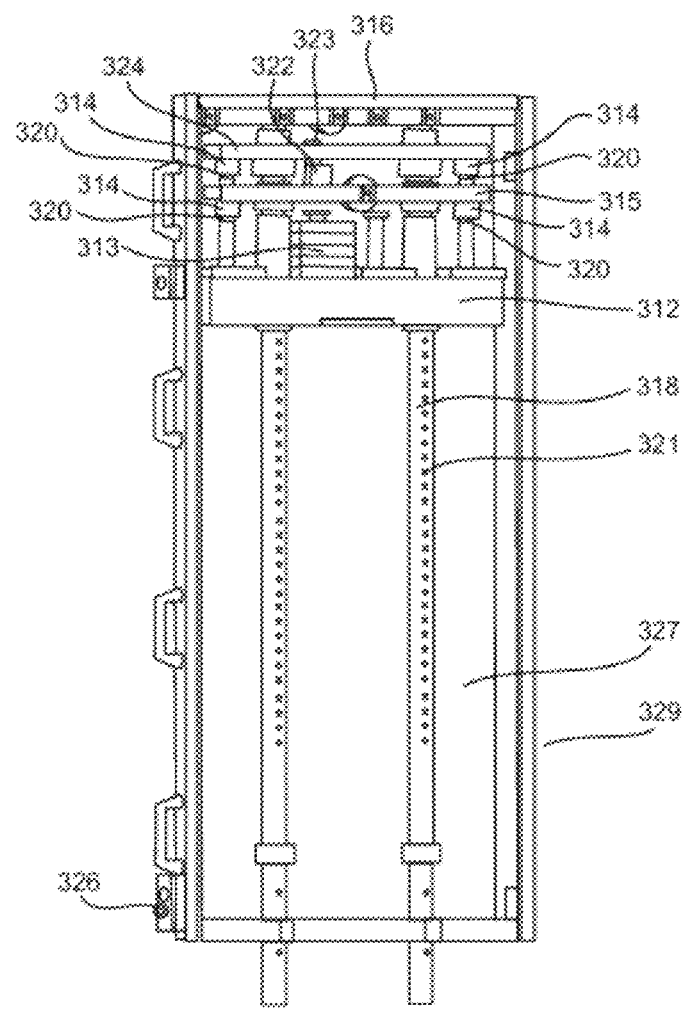

FIG. 3: Drive Module 329 for a Device 200 comprising Mass 312, Ad-On Weight 313, Holding Mechanism 314, Crossmember 315, Roof 316, Guide Column 318, Docking Plate 320, Hole 321, Pin for Signal Encoder 322, Entry Point for Pin 323, Crossmember 324, Safety Switch 326, Enclosure 327.

FIG. 4a: Test Module 430 for a Device 200 with closed Enclosure 427

FIG. 4b: Test Module 430 for a Device 200 with open Enclosure 427, Base Plate 401, Means to Secure Specimen 402, Clamping Plate 407, non-height-adjustable Crossmember 409 with Die Punch 411.

Figure 5:
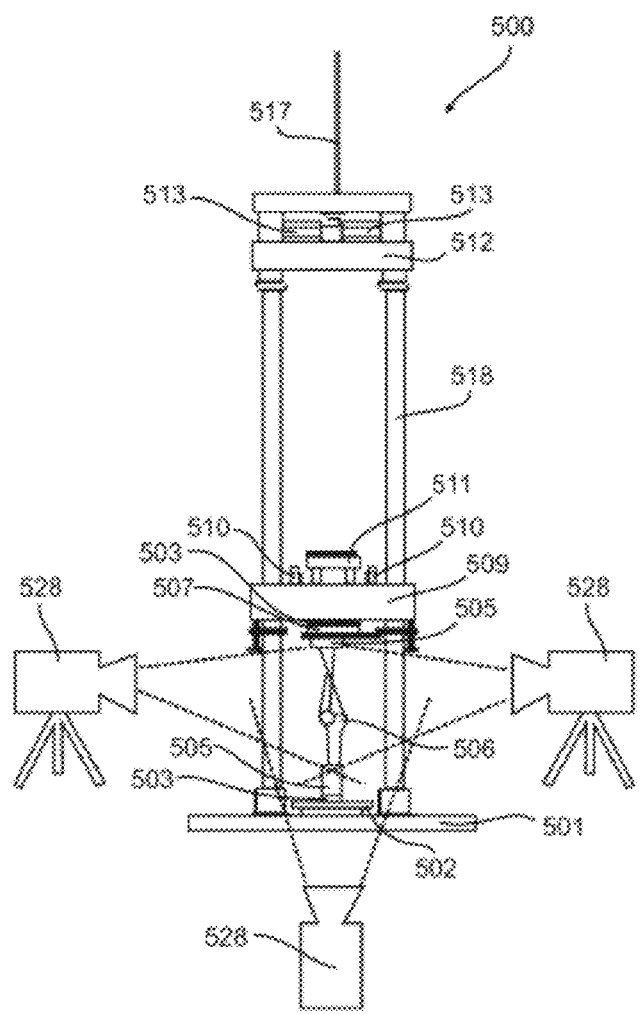

FIG. 5: Test Module for validating the calculated parameters and for establishing the method according to the invention using the calculated parameters, comprising a clamped-in Specimen 506 that is potted in a Mold 505 on the proximal and distal end, Cameras 528 and Force Sensors 503. A Mold 505 is fastened on the Means to Secure Specimen 502, the second Mold 505 is fastened to Clamping Plate 507. Device 500 comprises Base Plate 501, height-adjustable Crossmember 509 with Die Punch 511, Mass 512 with Add-On Weight 513, Adjustment Rod 517, Guide Columns 518.

Figure 6:
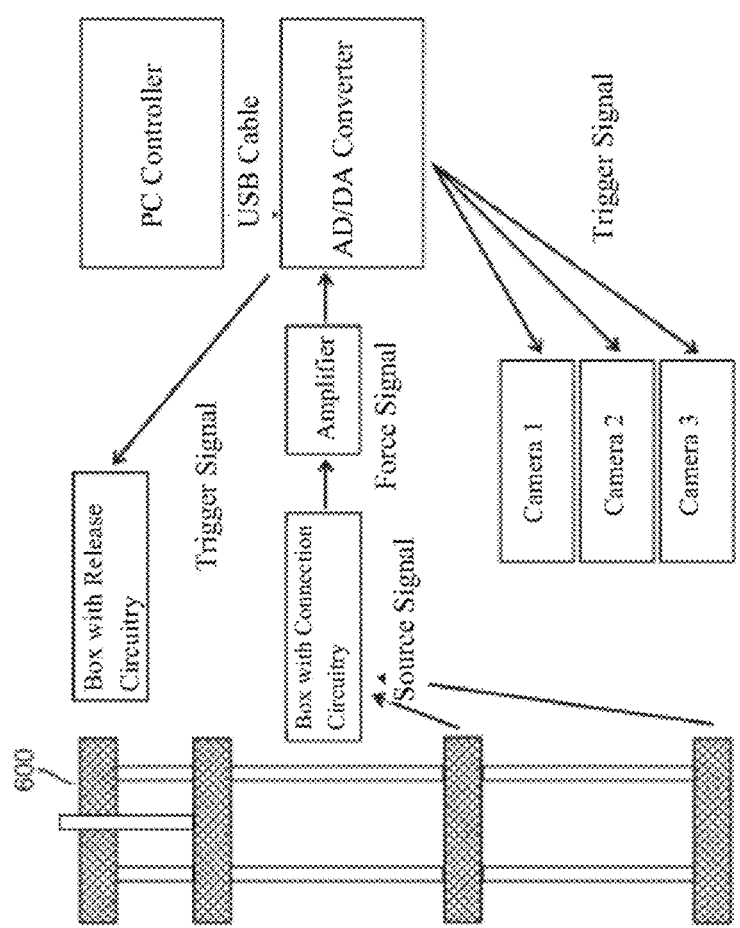

FIG. 6: Test setup with Device 600 for validating the calculated parameters and for establishing the method according to the invention using the calculated parameters.

The following examples are used to explain the method according to the invention and the human specimens according to the invention, which comprise a defined bone fracture. However, the invention is not limited to already reproducibly producible specimens with defined bone fractures, but can instead be used for further defined bone fractures, which can be produced in specimens in an analogous manner as discussed in the description and the examples.

Example 1: Alignment in a Defined Geometry for Reproducibly Producing Shaft Fractures of the Phalanges I-V (78 A2, B2, C2 According to AO)

A specimen 106 consisting of hand and lower arm is used for a shaft fracture of the phalanges I-V (78 A2, B2, C2 according to AO).

Specimen 106 is aligned in the defined geometry by severing the lower arm approx. 6-10 cm distally of the elbow. Approx. 5 cm of the soft tissue around the radius and ulna are removed on the proximal end of the lower arm base and the bones are vertically potted with cold-curing polymer in a Mold 105. Mold 105 is connected in Device 100 with Clamping Plate 107 on Die Punch 111. In this case, the severed surfaces of radius and ulna are placed centrally under the points of attack of the force. In this vertical position, the wrist is held in neutral alignment and the phalanges of the relevant finger digits are inserted into an Adapter (11 or 12). The phalanges should be aligned in a vertical as an imaginary extension below radius and ulna. In this clamping arrangement, the deadweight of Die Punch 111 holds Specimen 106 in the desired position. Adapter (11 or 12) is supported on the surface of Base Plate 101 of Device 100. With the inserted finger digits, the hand should not slide laterally or should only slide from neutral alignment when the hand does stand stiffly under the deadweight of Die Punch 111, but yields instead. The direction and amount by which the adapter with inserted fingers is shifted on the base plate is specimen-dependent.

The following settings are made on Device 100: the defined mass (falling mass) 5.2 to 9.8 kg, the defined speed as a function of drop height to 29 to 46 cm, the defined compression to 2 to 8 mm, and the defined damping as a function of the damped portion of the defined compression to 0 to 5 mm. Holding Mechanism 114 is released and the shaft fracture of the phalanges I-V (78 A2, B2, C2 according to AO) is produced in Specimen 106 with a probability of 86%.

Example 2: Alignment in a Defined Geometry for Reproducibly Producing Shaft Fractures of the Metacarpals I-V (77 A2, B2, C2 According to AO)

A specimen 106 consisting of hand and lower arm is used for a shaft fracture of the metacarpals I-V (77 A2, B2, C2 according to AO).

Specimen 106 is aligned in the defined geometry by severing the lower arm approx. 6-10 cm distally of the elbow. Specimen 106 is placed on the surface of a straight plate with the palm facing down; the lower arm is secured with tensioning straps in a supinate position. An adapter (6 or 7) is attached in Device 100 on the underside of Die Punch 111. The pin of the adapter is positioned vertically with the rounded side facing Specimen 106 under Die Punch 111. The adapter end is in this case placed centrally above the intended fracture location.

Where required, one or several foam pads are placed (specimen-dependent) between the adapter surface and Specimen 106. The foam pads prevent the adapter from sliding off from the intended fracture location and also passively increase the force transfer surface. The foam pads help to keep the skin of the fractured Specimen 106 intact.

The following settings are made on Device 100: the defined mass (falling mass) 7 to 11.2 kg, the defined speed as a function of drop height to 35 to 52 cm, the defined compression to 6 to 14 mm, and the defined damping as a function of the damped portion of the defined compression to 0 to 9 mm.

The holding mechanism is released and the shaft fracture of the metacarpals I-V (77 A2, B2, C2 according to AO) is produced in Specimen 106 with a probability of 79%.

Example 3: Alignment in a Defined Geometry for Reproducibly Producing a Distal Radius Fracture (Extension, 23 A2, 23 C1-C3 Dorsal According to AO)

A specimen 106 consisting of hand, lower arm, and upper arm is used for a distal radius fracture 23 A2, 23 C1-C3 (dorsal) according to AO.

Specimen 106 is aligned in the defined geometry by severing the upper arm approx. 10-12 cm distally of the humerus head. Approx. 5 cm of the soft tissue is removed on the severed humerus and the humerus bone is potted vertically in cold-curing polymer in a Mold 105. Mold 105 is connected in Device 100 with Clamping Plate 107 on Die Punch 111. In this case, the severed surface of the humerus is placed centrally under the point of attack of the force. From the maximum extension (typically between 176 and 189 degrees, the angle is specimen-dependent), the humeroulnar joint is articulated between 10 to 12 degrees. In this position, the lower arm is rotated from the maximum supination into a pronation from 60 to 70 degrees. The wrist is maximally (maximally means specimen-dependent, 59-68 degrees) extended from neutral alignment and supported on an Adapter 04.

The following settings are made on Device 100: the defined mass (falling mass) 16.8 to 19.3 kg, the defined speed as a function of drop height to 76 to 102 cm, the defined compression to 22 to 30 mm, and the defined damping as a function of the damped portion of the defined compression to 6 to 14 mm.

The holding mechanism is released and the distal radius fracture 23 A2, 23 C1-C3 (dorsal) according to AO is produced in Specimen 106 with a probability of 90%.

Example 4: Alignment in a Defined Geometry for Reproducibly Producing a Distal Radius Fracture (Flexion, 23 A2, Palmar According to AO)

A specimen 106 consisting of hand, lower arm, and upper arm is used for a distal radius fracture 23 A2, palmar according to AO.

Specimen 106 is aligned in the defined geometry by severing the upper arm approx. 10-12 cm distally of the humerus head. Approx. 5 cm of the soft tissue is removed on the severed humerus and the humerus bone is potted vertically in cold-curing polymer in a Mold 105. Mold 105 is connected in Device 100 with Clamping Plate 107 on Die Punch 111. In this case, the severed surface of the humerus is placed centrally under the point of attack of the force. From the maximum extension (typically between 176 and 189 degrees, the angle is specimen-dependents), the humeroulnar joint is articulated between 10 to 12 degrees. In this position, the lower arm is rotated from the maximum supination into a pronation from 50 to 60 degrees. The wrist is articulated by 45-58 degrees (from neutral alignment) and supported on a flat surface against Base Plate 101 of Device 100.

The following settings are made on Device 100: the defined mass (falling mass) 16.8 to 20.5 kg, the defined speed as a function of drop height to 82 to 102 cm, the defined compression to 25 to 35 mm, and the defined damping as a function of the damped portion of the defined compression to 5 to 17 mm. The holding mechanism is released and the distal radius fracture of classification 23 A2 (palmar) according to AO is produced in Specimen 106 with a probability of 86%.

Example 5: Alignment in a Defined Geometry for Reproducibly Producing a Distal Radius Fracture/Die-Punch Fracture (Conditionally 23 C1-C2 According to AO)

A specimen 106 consisting of hand, lower arm, and upper arm is used for a distal radius fracture/die-punch fracture of classification (conditionally) 23 C1-C2 according to AO.

Specimen 106 is aligned in the defined geometry by severing the upper arm approx. 10-12 cm distally of the humerus head. Approx. 5 cm of the soft tissue is removed on the severed humerus and the humerus bone is potted vertically in cold-curing polymer in a Mold 105. Mold 105 is connected in Device 100 with Clamping Plate 107 on Die Punch 111. In this case, the severed surface of the humerus is placed centrally under the point of attack of the force. From the maximum extension (typically between 176 and 189 degrees, the angle is specimen-dependent), the humeroulnar joint is articulated between 0 to 8 degrees. In this position, the lower arm is rotated from the maximum supination into a pronation from 45 to 52 degrees. The wrist is held in neutral alignment and supported on an Adapter 04 on the Base Plate 101 of Device 100. The hand in this case is wrapped around the grip rod of Adapter 04, the phalanges are bent. The hand then forms a fist that grabs the grip rod and is supported with phalanges II-IV against Base Plate 101 of Device 100.

The following settings are made on Device 100: the defined mass (falling mass) 17 to 23.1 kg, the defined speed as a function of drop height to 90 to 110 cm, the defined compression to 22 to 31 mm, and the defined damping as a function of the damped portion of the defined compression to 9 to 15 mm. The holding mechanism is released and the distal radius fracture die-punch fracture of classification (conditionally) 23 C1-C2 according to AO is produced in Specimen 106 with a probability of 69%.

Example 6: Alignment in a Defined Geometry for Reproducibly Producing a Distal Radius Fracture Chauffeur's Fracture (23 B1 According to AO)

A specimen 106 consisting of hand, lower arm, and upper arm is used for a distal radius fracture chauffeur's fracture of classification 23 B1 according to AO.

Specimen 106 is aligned in the defined geometry by severing the upper arm approx. 10-12 cm distally of the humerus head. Approx. 5 cm of the soft tissue is removed on the severed humerus and the humerus bone is potted vertically in cold-curing polymer in a Mold 105. Mold 105 is connected in Device 100 with Clamping Plate 107 on Die Punch 111. In this case, the severed surface of the humerus is placed centrally under the point of attack of the force. From the maximum extension (typically between 176 and 189 degrees, the angle is specimen-dependent), the humeroulnar joint is articulated between 0 to 8 degrees. In this position, the lower arm is rotated from the maximum supination into a pronation from 45 to 52 degrees. The wrist is extended 35-43 degrees from neutral alignment and supported on Adapter 02, which has a spherical surface, on the base of Device 100. The support location should be located in the transversal plane 3-8 cm (specimen-dependent) before the humerus shaft/point of attack of the force. On the round surface of Adapter 02, the hand should be shifted laterally until it has a radial abduction of 20 degrees (from neutral alignment)

The following settings are made on Device 100: the defined mass (falling mass) 16.6 to 18.3 kg, the defined speed as a function of drop height to 80 to 93 cm, the defined compression to 20 to 28 mm, and the defined damping as a function of the damped portion of the defined compression to 6 to 14 mm. The Holding Mechanism 114 is released and the distal radius fracture chauffeur's fracture (conditional) of classification 23 B1 according to AO is produced in Specimen 106 with a probability of 75%.

Example 7: Alignment in a Defined Geometry for Reproducibly Producing a Scaphoid Fracture (72 A2, B2-B3 According to AO)

A specimen 106 consisting of hand and lower arm is used for a scaphoid fracture (72 A2, B2-B3 according to AO).

Specimen 106 is aligned in the defined geometry by severing the lower arm approx. 6-10 cm distally of the elbow. On the proximal end of the lower arm base, approx. 5 cm of the soft tissue is removed around radius and ulna and the bones are vertically potted with cold-curing polymer in a Mold 105. Mold 105 is connected in Device 100 with Clamping Plate 107 on Die Punch 111. In this case, the severed surfaces of radius and ulna are placed centrally under the point of attack of the force. In this vertical position, the wrist is extended from neutral alignment by 35-50 degrees and is supported on an Adapter 04 on Base Plate 101. The support location is positioned in the transversal plane 0-4 cm behind the potted parts of the radius and ulna/point of attack of the force. On the cylindrical surface of Adapter 04, the hand is laterally shifted until it has a radial abduction of 3-6 degrees (from neutral alignment).

The following settings are made on Device 100: the defined mass (falling mass) 16.8 to 19.5 kg, the defined speed as a function of drop height to 75 to 88 cm, the defined compression to 24 to 32 mm, and the defined damping as a function of the damped portion of the defined compression to 10 to 17 mm. The Holding Mechanism 114 is released and the scaphoid fracture of classification 72 A2, B2-B3 according to AO is produced in Specimen 106 with a probability of 60%.

Example 8: Alignment in a Defined Geometry for Reproducibly Producing a Radius Head Fracture (Type I-III in Accordance with Mason, 21 B2 According to AO)

A specimen 106 consisting of hand, lower arm, and upper arm is used for a radius head fracture Type I-III in accordance with Mason, 21 B2 according to AO.

Specimen 106 is aligned in the defined geometry by severing the upper arm approx. 10-12 cm distally of the humerus head. Approx. 5 cm of the soft tissue is removed on the severed humerus and the humerus bone is potted vertically in cold-curing polymer in a Mold 105. Mold 105 is connected in Device 100 with Clamping Plate 107 on Die Punch 111. In this case, the severed surface of the humerus is placed centrally under the point of attack of the force. From the maximum extension (typically between 176 and 189 degrees, the angle is specimen-dependent), the humeroulnar joint is articulated between 0 to 8 degrees. In this position, the lower arm is rotated from the maximum supination into a pronation from 45 to 52 degrees. The hand is secured in a fist alignment with bandages, the wrist is in this case rigidly positioned in neutral alignment. The bandaged portion of the specimen is supported vertically in an Adapter 16. Where required, one or several foam pads are installed (specimen-dependent) on the bottom of Adapter 16 under the supported hand Adapter 16 is filled with quartz sand and screwed down on Base Plate 101 of Device 100. The fill volume of the adapter should be 12-15 cm as measured from Base Plate 101. The support location on Base Plate 101 is positioned in the transversal plane 3-8 cm (specimen-dependent) before the humerus shaft/point of attack of the force.

These foam pads protect the biological structures in the wrist area by passively increasing the force transfer surface. The foam pads prevent Specimen 106 from fracturing below the intended position.

The following settings are made on Device 100: the defined mass (falling mass) 18.3 to 21.5 kg, the defined speed as a function of drop height to 75 to 88 cm, the defined compression to 21 to 29 mm, and the defined damping as a function of the damped portion of the defined compression to 9 to 15 mm. Holding Mechanism 114 is released and the radius head fracture of classification Type I-III in accordance with Mason, 21 B2 according to AO is produced in Specimen 106 with a probability of 79%.

Example 9: Alignment in a Defined Geometry for Reproducibly Producing a Coronoid Fracture (Regan & Money Type I-III, 21 B1 According to AO)

A specimen 106 consisting of hand, lower arm, and upper arm is prepared for a coronoid fracture Regan & Money Type I-III, 21 B1 according to AO.

Specimen 106 is aligned in the defined geometry by severing the upper arm approx. 10-12 cm distally of the humerus head. Approx. 5 cm of the soft tissue is removed on the severed humerus and the humerus bone is potted vertically in cold-curing polymer in a Mold 105. Mold 105 is connected in Device 100 with Clamping Plate 107 on Die Punch 111. In this case, the severed surface of the humerus is placed centrally under the point of attack of the force. The humeroulnar joint is held in the maximum extension (typically between 176 and 189 degrees, the angle is specimen-dependent) the lower arm is secured in neutral alignment. The hand is secured in a fist alignment with bandages, the wrist is in this case rigidly positioned in neutral alignment. The bandaged portion of Specimen 106 is supported vertically in an Adapter 16. Where required, one or several foam pads are installed (specimen-dependent) on the bottom of Adapter 16 under the supported hand Adapter 16 is filled with quartz sand and screwed down on Base Plate 101. The fill volume of the adapter should be 12-15 cm as measured from the bottom. The support location on Base Plate 101 is positioned in the transversal plane 3-8 cm (specimen-dependent) before the humerus shaft/point of attack of the force.

The foam pads protect the biological structures in the wrist area by passively increasing the force transfer surface. The foam pads prevent Specimen 106 from fracturing below the intended position.

The following settings are made on Device 100: the defined mass (falling mass) 18.2 to 22.8 kg, the defined speed as a function of drop height to 75 to 86 cm, the defined compression to 20 to 33 cm, and the defined damping as a function of the damped portion of the defined compression to 8 to 16 mm. Holding Mechanism 114 is released and the coronoid fracture of classification Regan & Morrey Type I-III, 21 B1 according to AO is produced in Specimen 106 with a probability of 90%.

Example 10: Alignment in a Defined Geometry for Reproducibly Producing a Terrible Triad (21 C1 According to AO)

A specimen 106 consisting of hand, lower arm, and upper arm is prepared for a terrible triad (21 C1 according to AO). Specimen 106 is aligned in the defined geometry by severing the upper arm approx. 10-12 cm distally of the humerus head. Approx. 5 cm of the soft tissue is removed on the severed humerus and the humerus bone is potted vertically in cold-curing polymer in a Mold 105. Mold 105 is connected in Device 100 with Clamping Plate 107 on Die Punch 111. In this case, the severed surface of the humerus is placed centrally under the point of attack of the force. From the maximum extension (typically between 176 and 189 degrees, the angle is specimen-dependent), the humeroulnar joint is articulated between 0 to 8 degrees. and the lower arm is secured in neutral alignment. In this position, the lower arm is rotated from neutral alignment to maximum pronation. The hand is secured in a fist alignment with bandages, the wrist is in this case rigidly positioned in neutral alignment. The bandaged part of the specimen is supported vertically in an adapter 16. One or several foam pads are installed (specimen-dependent) on the bottom of Adapter 16 under the supported hand Adapter 16 is filled with quartz sand and screwed down on Base Plate 101. The fill volume of the adapter should be 12-15 cm as measured from Base Plate 101. The support location on Base Plate 101 is positioned in the transversal plane 3-8 cm (specimen-dependent) before the humerus shaft/point of attack of the force.

These foam pads protect the biological structures in the wrist area by passively increasing the force transfer surface. The foam pads prevent Specimen 106 from fracturing below the intended position.

The following settings are made on Device 100: the defined mass (falling mass) 18.9 to 26.8 kg, the defined speed as a function of drop height to 85 to 100 cm, the defined compression to 24 to 38 mm, and the defined damping as a function of the damped portion of the defined compression to 10 to 18 mm. Holding Mechanism 114 is released and the terrible triad of classification 21 C1 according to AO) is produced in Specimen 106 with a probability of 92%.

Example 11: Alignment in a Defined Geometry for Reproducibly Producing an Olecranon Fracture (21 B1, C1 According to AO)

A specimen 106 consisting of hand, lower arm, and upper arm is prepared for an olecranon fracture 21 B1, C1 according to AO.

Specimen 106 is aligned in the defined geometry by severing the humerus approx. 6-10 cm distally of the humerus head. Approx. 5 cm of the soft tissue is removed on the proximal end of the severed humerus and the bone is potted vertically in cold-curing polymer in a Mold 105. Mold 105 is connected in Device 100 with Clamping Plate 107 on Die Punch 111. In this case, the severed surface of the humerus is placed centrally under the point of attack of the force. The humeroulnar joint is articulated by 90 degrees, the olecranon is supported on an Adapter 03 having the shape of a truncated cone on Base Plate 101 of Device 100. The lower arm should be held in supinate alignment. The support location is positioned in the transversal plane below the potted humerus.

The following settings are made on Device 100: the defined mass (falling mass) 17.1 to 20 kg, the defined speed as a function of drop height to 61 to 79 cm, the defined compression to 4 to 17 mm, and the defined damping as a function of the damped portion of the defined compression to 0 to 9 mm. Holding Mechanism 114 is released and the olecranon fracture of classification 21 B1, C1 according to AO is produced in Specimen 106 with a probability of 94%.

Example 12: Alignment in a Defined Geometry for Reproducibly Producing a Monteggia Fracture (21 A1, B1 According to AO)

A specimen 106 consisting of hand, lower arm, and upper arm is prepared for a Monteggia fracture 21 A1, B1 according to AO.

Specimen 106 is aligned in the defined geometry by severing the humerus approx. 10-12 cm distally of the humerus head. On the proximal end of the severed humerus, approx. 5 cm of the soft tissue is removed and the bone is potted vertically in cold-curing polymer in a Mold 105. Mold 105 is connected on Base Plate 101 on Device 100 according to the invention with Means to Secure Specimen 102, for example an adjustable carriage. In this case, the severed surface of the humerus is placed centrally under the point of attack of the force. Specimen 106 then stands in Device 100 with the ulna/olecranon facing up. An Adapter 18 is attached on Clamping Plate 107 under Die Punch 111. Therein, the lower arm is clamped from medial and lateral. In this case, the flexion angle of the humeroulnar joint ranges between 90 and 100 degrees. The support location of the adapter on the ulna is positioned in the transversal plane 4-6 cm before the potting location/7-9 cm distally of the olecranon tip, on the radius 2-5 cm before the potting location/5-7 cm distally of the olecranon tip. The lower arm is in this case secured in maximum supination.

The following settings are made on Device 100: the defined mass (falling mass) 16.8 to 17.9 kg, the defined speed as a function of drop height to 72 to 88 cm, the defined compression to 28 to 46 mm, and the defined damping as a function of the damped portion of the defined compression to 10 to 17 mm. Holding Mechanism 114 is released and the Monteggia fracture of classification 21 A1, B1 according to AO is produced in Specimen 106 with a probability of 60%.

Example 13: Alignment in a Defined Geometry for Reproducibly Producing a Monteggia-Like Lesion (21 B3 According to AO)

A specimen 106 consisting of hand, lower arm, and upper arm is prepared for a Monteggia-like lesion 21 B3 according to AO.

Specimen 106 is aligned in the defined geometry by severing the humerus approx. 10-12 cm distally of the humerus head. Approx. 5 cm of the soft tissue is removed on the on proximal end of the severed humerus and the bone is potted vertically in cold-curing polymer in a Mold 105. Mold 105 is connected on Base Plate 101 on Device 100 with Means for Securing Specimen 102, for example an adjustable carriage. In this case, the severed surface of the humerus is placed centrally under the point of attack of the force. Specimen 106 then stands in Device 100 with the ulna/olecranon facing up. An Adapter 18 is attached on Clamping Plate 107 under Die Punch 111. Therein, the lower arm is clamped from medial and lateral. In this case, the flexion angle of the humeroulnar joint should range between 80 and 95 degrees. The support location of the adapter on the ulna is positioned in the transversal plane 3-5 cm before the potting location/6-7 cm distally of the olecranon tip, on the radius 2-5 cm before the potting location/5-7 cm distally of the olecranon tip. The lower arm must in this case be secured in maximum supination.

The following settings are made on Device 100: the defined mass (falling mass) 16.8 to 18.4 kg, the defined speed as a function of drop height to 75 to 92 cm, the defined compression to 30 to 46 mm, and the defined damping as a function of the damped portion of the defined compression to 9 to 21 mm. Holding Mechanism 114 is released and the Monteggia-like lesion of classification 21 B3 according to AO is produced in Specimen 106 with a probability of 66%.

Example 14: Alignment in a Defined Geometry for Reproducibly Producing a Galeazzi Fracture (22 A3, B3, C1-C3 According to AO)

A specimen 106 consisting of hand, lower arm, and upper arm is prepared for a Galeazzi fracture 22 A3, B3, C1-C3 according to AO.

Specimen 106 is aligned in the defined geometry by severing the upper arm approx. 10-12 cm distally of the humerus head. Approx. 5 cm of the soft tissue is removed on the severed humerus and the humerus bone is potted vertically in cold-curing polymer in a Mold 105. Mold 105 is connected in Device 100 with Clamping Plate 107 on Die Punch 111. In this case, the severed surface of the humerus is placed centrally under the point of attack of the force. From the maximum extension (typically between 176 and 189 degrees, the angle is specimen-dependent), the humeroulnar joint is articulated between 5 to 12 degrees. In this position, the lower arm is rotated from neutral alignment to maximum supination. The wrist is secured with bandages in extension alignment between 80-90 degrees and is vertically supported on an Adapter 16. Various foam pads are installed (specimen-dependent) on the bottom of Adapter 16 under the supported hand. These foam pads (there are 3 different hardness levels) protect the biological structures in the wrist area by passively increasing the force transfer surface. These foam pads prevent Specimen 106 from fracturing below the intended position. Adapter 16 is filled with quartz sand and screwed down on Base Plate 101. The fill volume of the adapter should be 6-8 cm as measured from the bottom. The support location on Base Plate 101 is positioned in the transversal plane 3-8 cm (specimen-dependent) before the humerus shaft/point of attack of the force.

The following settings are made on Device 100: the defined mass (falling mass) 18.5 to 22.6 kg, the defined speed as a function of drop height to 95 to 107 cm, the defined compression to 24 to 39 mm, and the defined damping as a function of the damped portion of the defined compression to 6 to 17 mm. Holding Mechanism 114 is released and the Galeazzi fracture of classification 22 A3, B3, C1-C3 according to AO is produced in Specimen 106 with a probability of 53%.

Example 15: Alignment in a Defined Geometry for Reproducibly Producing a Capitulum Fracture (13 B3 According to AO)

A specimen 106 consisting of hand, lower arm, and upper arm is prepared for a capitulum fracture 13 B3 according to AO.

Specimen 106 is aligned in the defined geometry by severing the humerus approx. 10-12 cm distally of the humerus head. Approx. 5 cm of the soft tissue around tibia and fibula is removed on the proximal end of the severed humerus and the bones are potted vertically in cold-curing polymer in a Mold 105. Mold 105 is connected on Base Plate 101 on Device 100 with Means to Secure Specimen 102, for example an adjustable carriage. In this case, the severed surface of the humerus is placed centrally under the point of attack of the force. Specimen 106 then stands in Device 100 with the ulna/olecranon facing up. An Adapter 05 or 08 is attached on Clamping Plate 107 under Die Punch 111. The ulna surface is supported against the slanted surface of Adapter 05 or 08. In this case, the flexion angle of the humeroulnar joint ranges between 90 and 115 degrees. The support location of the olecranon is positioned in the transversal plane above the potting location. The lower arm should be secured in maximum supination.

The following settings are made on Device 100: the defined mass (falling mass) 20.5 to 24.2 kg, the defined speed as a function of drop height to 70 to 81 cm, the defined compression to 14 to 22 mm, and the defined damping as a function of the damped portion of the defined compression to 6 to 13 mm. Holding Mechanism 114 is released and the capitulum fracture of classification 13 B3 according to AO is produced in Specimen 106 with a probability of 72%.

Example 16: Alignment in a Defined Geometry for Reproducibly Producing a Distal Humerus Fracture (13 B1, B2, C1-C3 According to AO)

A specimen 106 consisting of hand, lower arm, and upper arm is prepared for a distal humerus fracture 13 B1, B2, C1-C3 according to AO.

Specimen 106 is aligned in the defined geometry by severing the humerus approx. 16-20 cm distally of the humerus head. Approx. 5 cm of the soft tissue is removed on the proximal end of the severed humerus and the bone is potted vertically in cold-curing polymer in a Mold 105. Mold 105 is connected on Base Plate 101 on Device 100 with Means to Secure Specimen 102, for example an adjustable carriage. In this case, the severed surface of the humerus is placed centrally under the point of attack of the force. Specimen 106 then stands in Device 100 with the ulna/olecranon facing up. An Adapter 05, 09, or 10 is attached on Clamping Plate 107 under Die Punch 111. The ulna surface is supported against the slanted surface of Adapter 05, 08, or 10. In this case, the flexion angle of the humeroulnar joint should range between 120 and 150 degrees. The support location of the olecranon is positioned in the transversal plane above the potting location. The lower arm should be secured in maximum supination.

The following settings are made on Device 100: the defined mass (falling mass) 20.2 to 27.2 kg, the defined speed as a function of drop height to 68 to 81 cm, the defined compression to 26 to 37 mm, and the defined damping as a function of the damped portion of the defined compression to 0 to 15 mm. Holding Mechanism 114 is released and the distal humerus fracture of classification 13 B1, B2, C1-C3 according to AO is produced in Specimen 106 with a probability of 79%.

Example 17: Alignment in a Defined Geometry for Reproducibly Producing a Clavicle Shaft Fracture (Type A and B According to AO)

A specimen 106 consisting of humerus, scapula, clavicle, and sternum base is prepared for a clavicle shaft fracture Type A and B according to AO.

Specimen 106 is aligned in the defined geometry by severing the upper arm approx. 10-12 cm distally of the humerus head. Approx. 3 cm of the soft tissue is removed on the severed humerus. On the scapula, the angulus inferior is severed 7-8 cm below the horizontal, such that the severed edge is parallel to the spina scapulae. The scapula and humerus are potted vertically at a depth of 3 cm along their severed edges in an Adapter 12 using cold-curing polymer. The vertical alignment of the scapula to the severed edge below the spina must be verified without lateral tipping. The Adapter 12 is then connected in Device 100 with Means to Secure Specimen 102, for example an adjustable carriage on Base Plate 101. An Adapter 03 in the shape of a truncated cone is integrated on the Clamping Plate 107 below Die Punch 111. Means to Secure Specimen 102, for example an adjustable carriage is positioned on Base Plate 101 such that the intended (marking) fracture location of the clavicle is positioned centrally under the point of attack of the force/Adapter 03. For all clavicle shaft fractures Type A and B, the marking is located along the transition of the S-shaped curvature (5-8 cm medially of the sternum base). The medial end of the clavicle is secured in a clamping ring on a height-adjustable Adapter 14. A 5 mm thick foam pad is located within the clamping ring, said foam permitting minimal movement of the clavicle in all directions. The height of the medial end is adjusted to the height of the lateral end/the humerus head.

The following settings are made on Device 100: the defined mass (falling mass) 12.3 to 16.5 kg, the defined speed as a function of drop height to 55 to 68 cm, the defined compression to 4 to 12 mm, and the defined damping as a function of the damped portion of the defined compression to 0 to 6 mm. Holding Mechanism 114 is released and the clavicle shaft fracture of classification Type A and B according to AO is produced in Specimen 106 with a probability of 70%.

Example 18: Alignment in a Defined Geometry for Reproducibly Producing a Lateral Clavicle Shaft Fracture (Type I and II in Accordance with Neer)

A specimen 106 consisting of humerus, scapula, clavicle, and sternum base is prepared for a lateral clavicle shaft fracture Type I and II in accordance with Neer.

Specimen 106 is aligned in the defined geometry by severing the upper arm approx. 10-12 cm distally of the humerus head. Approx. 3 cm of the soft tissue is removed on the severed humerus. On the scapula, the angulus inferior is severed 7-8 cm below the horizontal, such that the severed edge is parallel to the spina scapulae. The scapula and humerus are potted vertically at a depth of 3 cm along their severed edges in an Adapter 12 using cold-curing polymer. The vertical alignment of the scapula to the severed edge below the spina must be verified without lateral tipping. The Adapter 12 is then connected in Device 100 with Means to Secure Specimen 102, for example an adjustable carriage on Base Plate 101. An Adapter 02 with spherical shape is integrated on the Clamping Plate 107 below Die Punch 111. Means to Secure Specimen 102, for example the carriage, is positioned on Base Plate (101) such that the intended fracture location of the clavicle is positioned centrally under the point of attack of the force/Adapter 02. For all aforementioned fractures, the marking should be located in the shoulder triangle (between clavicle, processus coracoidus, and acromion). The medial end of the clavicle is secured in a clamping ring on a height-adjustable Adapter 14. A 5 mm thick foam pad is located within the clamping ring, said foam permitting minimal movement of the clavicle in all directions. The height of the medial end is adjusted to the height of the lateral end/the humerus head.

The following settings are made on Device 100: the defined mass (falling mass) 10.3 to 21.9 kg, the defined speed as a function of drop height to 57 to 76 cm, the defined compression to 4 to 14 mm, and the defined damping as a function of the damped portion of the defined compression to 0 to 7 mm. Holding Mechanism 114 is released and the lateral clavicle fracture of classification Type I and II in accordance with Neer is produced in Specimen 106 with a probability of 52%.

Example 19: Alignment in a Defined Geometry for Reproducibly Producing a Proximal Humerus Fracture (11 B1, B3, C1-C3 According to AO)

A specimen 106 consisting of humerus, scapula, clavicle, and sternum base is prepared for a proximal humerus fracture 11 B1, B3, C1-C3 according to AO.

Specimen 106 is aligned in the defined geometry by severing the upper arm approx. 16-20 cm distally of the humerus head. Approx. 5 cm of the soft tissue is removed on the severed humerus and the humerus bone is then potted vertically in a Mold 105 using cold-curing polymer. Approx. 3 cm of the scapula is laid bare along its medial edge (margo medialis) and is then potted with the medial edge at an approx. depth of 3 cm in an Adapter 12 using cold-curing polymer. The vertical alignment of the scapula on the medial edge without lateral tipping must be crucially verified. While the polymer cures, the humerus should be held in a 90 degree abduction alignment in order to simulate the subsequent alignment in Device 100. The Adapter 12 is then connected in Device 100 with Means to Secure Specimen 102, for example an adjustable carriage, on Base Plate 101. Mold 105 is connected in Device 100 according to the invention with Clamping Plate 107 on Die Punch 111. The severed surface of the humerus in this case is placed centrally under the point of attack of the force. Means for Securing Specimen 102, for example the adjustable carriage, is positioned on Base Plate 101 such that the secured humerus is positioned in the joint socket of the scapula with an abduction angle of 85-95 degrees. The humerus should also have an inner rotation of 10-15 degrees in relation to the scapula.

The following settings are made on Device 100: the defined mass (falling mass) 19.2 to 28.8 kg, the defined speed as a function of drop height to 65 to 88 cm, the defined compression to 29 to 44 mm, and the defined damping as a function of the damped portion of the defined compression to 0 to 16 mm. Holding Mechanism 114 is released and the proximal humerus fracture of classification 11 B1, B3, C1-C3 according to AO is produced in Specimen 106 with a probability of 76%.

Example 20: Alignment in a Defined Geometry for Reproducibly Producing a Distal Femur Fracture (33 C1-C3 According to AO)

A specimen 106 consisting of foot, lower leg, thigh is clamped in for a distal femur fracture 33 C1-C3 according to AO.

Specimen 106 is aligned in the specified geometry by placing the foot on Base Plate 101 of Device 100; the knee is articulated between 110 degrees and 130 degrees and secured with an Adapter 17 under Die Punch 111. Adapter 17 is modeled after an inverted vice. This means that it applies a parallel clamping from 2 sides (lateral and medial) on the selected Specimen 106. Specimen 106 is stably secured as a result. The adapter is screwed to Die Punch 111. The impulse is then directly transferred onto Specimen 106. Adapter 17 has a universal joint that is used to adjust the surface area pressing on the femur. As a result, the point of attack of the force can be accurately/fracture-specifically targeted in the joint. The knee joint should be positioned in the transversal plane 4-8 cm before the ankle; the inner angle of the knee joint should be between 100 degrees and 130 degrees. The tibia rotation should not be influenced. The lateral inclination (varus/valgus) should also not be influenced, but should not exceed 5 degrees.

The following settings are made on Device 100: the defined mass (falling mass) 26.0 to 38.7 kg, the defined speed as a function of drop height to 99 to 116 cm, the defined compression to 31 to 49 mm, and the defined damping as a function of the damped portion of the defined compression to 0 to 37 mm. Holding Mechanism 114 is released and the distal femur fracture of classification 33 C1-C3 according to AO is produced in Specimen 106.

Example 21: Alignment in a Defined Geometry for Reproducibly Producing a Tibia Head Fracture (41 B1 According to AO)

A specimen 106 consisting of foot, lower leg, thigh is clamped in for a (proximal) tibia head fracture 41 B1 according to AO.

Specimen 106 is aligned in the specified geometry by placing the foot on Base Plate 101 of Device 100 and securing the foot with an Adapter 17 under Die Punch 111. Adapter 17 is modeled after an inverted vice. This means that it applies a parallel clamping from 2 sides (lateral and medial) on the selected Specimen 106. Specimen 106 is stably secured as a result. The adapter is screwed to Die Punch 111. The impulse is then directly transferred onto Specimen 106. Adapter 17 has a universal joint that is used to adjust the surface area pressing on the femur.

As a result, the point of attack of the force can be accurately/fracture-specifically targeted in the joint. The knee angle should range between 90 degrees and 105 degrees. The knee joint should be positioned in the transversal plane 2-4 cm before the ankle. The dorsal extension of the foot should range between 0 degrees and 10 degrees. The tibia rotation should not be influenced. The lateral inclination (varus/valgus) should not exceed 0 to 5 degrees valgus.

The following settings are made on Device 100: the defined mass (falling mass) 26.0 to 31 kg, the defined speed as a function of drop height to 96 to 112 cm, the defined compression to 35 to 47 mm, and the defined damping as a function of the damped portion of the defined compression to 10 to 13 mm. Holding Mechanism 114 is released and the tibia head fracture of classification 41 B1 according to AO is produced in Specimen 106 with a probability of 72%.

Example 22: Alignment in a Defined Geometry for Reproducibly Producing a Talus Fracture (Type II, Type III in Accordance with Hawkins)

A specimen 106 consisting of foot and lower leg is clamped in for a talus fracture Type II, Type III in accordance with Hawkins.

Specimen 106 is aligned in the specified geometry by severing the lower leg approx. 15-20 cm distally of the tibia head. On the proximal end of the lower leg base, approx. 5 cm of the soft tissue around tibia and fibula is removed and the bones are potted vertically in a Mold 105 using cold-curing polymer. Mold 105 is connected to Device 100 according to the invention with Clamping Plate 107 on Die Punch 111. This places the severed surfaces of tibia and fibula centrally under the point of attack of the force. The ball of the foot is stably placed on an Adapter 03 and secured with tensioning straps. The plantar flexion of the foot should in this case range between 10 to 15 degrees. The lateral inclination (inversion and eversion) should not be influenced. The ankle should be placed in the transversal plane 1-3 cm before the potting location.

The following settings are made on Device 100: the defined mass (falling mass) 24.8 to 37.2 kg, the defined speed as a function of drop height to 68 to 83 cm, the defined compression to 26 to 48 mm, and the defined damping as a function of the damped portion of the defined compression to 0 to 22 mm. Holding Mechanism 114 is released and the talus fracture of classification Type II, Type III in accordance with Hawkins is produced in Specimen 106.

Example 23: Alignment in a Defined Geometry for Reproducibly Producing a Pilon Fracture (43 B3-B4, C1-C3 According to AO)

A specimen 106 consisting of foot and lower leg is clamped in for a pilon fracture 43 B3-B4, C1-C3 according to AO.

Specimen 106 is aligned in the specified geometry by severing the lower leg approx. 15-20 cm distally of the tibia head. On the proximal end of the lower leg base, approx. 5 cm of the soft tissue around tibia and fibula is removed and the bones are potted vertically in a Mold 105 using cold-curing polymer. Mold 105 is connected to Device 100 with Means to Secure Specimen 102, for example an adjustable carriage onto Base Plate 101. The severed surfaces of tibia and fibula should in this case be positioned centrally under the point of attack of the force. The foot is therefore positioned flatly under Die Punch 111 with the sole facing up against Clamping Plate 107. The ankle should be positioned in the transversal plane above the potting location; the dorsal extension of the foot should not exceed 5 degrees The following settings are made on Device 100: the defined mass (falling mass) 24.7 to 38.5 kg, the defined speed as a function of drop height to 100 to 111 cm, the defined compression to 30 to 51 mm, and the defined damping as a function of the damped portion of the defined compression to 0 to 25 mm. Holding Mechanism 114 is released and the pilon fracture of classification 43 B3-B4, C1-C3 according to AO is produced in Specimen 106 with a probability of 62%.

Example 24: Alignment in a Defined Geometry for Reproducibly Producing a Calcaneous Fracture (Type 2A, 2C, Type 3AB, 3AC in Accordance with Sanders)

A specimen 106 consisting of foot and lower leg is clamped in for a calcaneous fracture Type 2A, 2C, Type 3AB, 3AC in accordance with Sanders.

Specimen 106 is aligned in the specified geometry by severing the lower leg approx. 15-20 cm distally of the tibia head. On the proximal end of the lower leg base, approx. 5 cm of the soft tissue around tibia and fibula is removed and the bones are potted vertically in a Mold 105 using cold-curing polymer. Mold 105 is connected to Device 100 according to the invention with Clamping Plate 107 to Die Punch 111. The severed surfaces of tibia and fibula are in this case positioned centrally under the point of attack of the force. This should position the ankle in the transversal plane below the potting location. The calcaneus is stably placed on an Adapter 03; the plantar flexion of the foot should in this case not exceed 10 degrees.

The following settings are made on Device 100: the defined mass (falling mass) 24.1 to 32.7 kg, the defined speed as a function of drop height to 90 to 98 cm, the defined compression to 25 to 43 mm, and the defined damping as a function of the damped portion of the defined compression to 0 to 18 mm. Holding Mechanism 114 is released and the calcaneous fracture of classification Type 2A, 2C, Type 3AB, 3AC in accordance with Sanders is produced in Specimen 106 with a probability of 61%.

Example 25: Exemplary Procedure for Producing a Newly Defined Bone Fracture in a Specimen 106

The following ingoing situation applies based on the assumption that the newly defined bone fracture is produced as a result of a bicycle accident wherein a person having a body height of 165 cm and body weight of 50 kg falls forward onto the road onto the outstretched arms or hands:

The fall height is 155 cm and the initial speed is 15 km/h.

$$E_{total} = E_{kin} + E_{pot} \tag{1}$$
$$= (m/2 * v^2) + m * g * h \tag{2}$$
$$= (50 \text{ kg}/2 * (4.16 \text{ m/s})^2) + 50 \text{ kg} * 9.81 \text{ m/s}^2 * 1.55 \text{ m} \tag{3}$$
$$= 1194 \text{ J} \tag{4}$$

The bicycle rider therefore has an energy of about 1.2 kilo joules before she impacts the ground.

This example shows the dimensions generated by the initial model calculations. These are based on examples of actual bicycle accidents. By inserting various masses for accident victims and various speeds on impact of accident victims while falling from the bicycle, one obtains an energy range that applies for producing the bone fracture typical for a bicycle accident (=selected defined bone fracture with accompanying soft tissue injuries). This defined bone fracture, which is typical during a bicycle accident when falling over the handlebar, can for example be classified according to the AO trauma classification. Based on known model calculations, the calculated energy on impact during an actual accident and the biochemical parameters of the accident victim, such as the joint alignment in the arm or the hand of the accident victim on impact with road, can be used to determine or calculate the parameters, specifically the defined mass, the defined direction, the defined speed of the calculated defined mass on impact, the defined geometry of Specimen 106 in relation to the calculated force impact on impact, the defined compression of specimen 106, the damping on impact of the defined mass.

The joints angles are set with a goniometer and are documented for all simulations. The adjustments/preloads of varus/valgus can also be made with tensioning straps.

Example 26: Validation of Defined Parameters

Specimen 106 is clamped into Device 100, 500 in the defined geometry and the settings (defined mass, defined speed as a function of the defined height of the falling mass, defined compression, and defined damping) are made on Device 100, 500. The force transferred onto the specimens by the impulse during the force impact is measured by three load cells (Type 9011A Kistler, Winterthur, Switzerland) or force sensors inserted in the die punch. In order to fulfill the aforementioned scanning theorem and to obtain a sufficient number of readings over the short duration of the force impact, the signal of the load cells was recorded at 100,000 Hz during the trials with the prototype. The force sensors were arranged in the transversal plane as an isosceles triangle. Based on this arrangement and the individual force values output by the three sensors, the force vector and therefore the point of attack of the force can be retroactively determined from the directional vectors. The force vector should be projected axially (in z direction) through Specimen 106. A further force sensor (Type 9061A, Kistler, Winterthur, Switzerland) was installed below the clamped-in specimen and also scanned with 100,000 Hz. The difference of the two force signals can be used to estimate the energy absorbed by the biological tissue.

Three High-Speed Cameras 528 (Type HCC 1000 (F) BGE, Vosskühler, Allied Vision Technologies GmbH, Stadtroda) are used for optically recording the injury sequence. The image resolution of the cameras is variable but is mostly set to 1024×256 pixels in order to achieve the highest possible recording rate of 1825 fps (frames per second). Due to the rapid introduction of force, the recorded datasets result in 15 to 20 images per Specimen 106 and camera for analysis. For all tests, the alignment of the cameras is optimized to the markings applied on Specimen 106 and the cameras are arranged at approx. a 120 degree spacing around Specimen 106 (FIG. 5). All cameras are calibrated before and after the practical tests. During the subsequent image analysis, the calibration is intended as a scale reference for the length ratios of the recorded specimens.

The invention claimed is:

1. A method for producing a prepared specimen comprising a defined bone fracture with accompanying soft tissue injuries in a donor specimen, the donor specimen comprising a hand, a lower arm and an upper arm, the donor specimen being severed from a deceased human donor distal the upper arm, the donor specimen further comprising bone and soft tissue mantle, the soft tissue mantle comprising at least muscles, ligaments, tendons, joint capsules, nerves, skin and vessels, wherein the defined bone fracture is a defined distal radius fracture with accompanying soft tissue injuries, wherein a device is provided which comprises:
  i. at least one guide column,
  ii. at one end of the guide column a base plate,
  iii. a traverse with impact punch,
  iv. at least one means for adjusting a damping to which the specimen is exposed during the impact of the defined mass,
  v. at least one clamping plate for securing the donor specimen,
  vi. a mass and optionally an additional weight for adjusting a defined mass, the defined mass being 16.6 to 23.1 kg;
  vii. at least one further traverse with at least one releasable holding mechanism for positioning the defined mass; and
  viii. means for securing the donor specimen within the device, wherein, the method comprises:
  a) orienting the donor specimen in a defined geometry with respect to the direction from which the defined mass impacts with the donor specimen when the holding mechanism is released, with the aid of the means for securing the donor specimen, in one of the following positions:
    wherein the cut surface of the humerus is positioned centrally under the point of attack of the force, the humeroulnar joint is flexed from maximum extension by 0 to 8 degrees and in this position the forearm is rotated from maximum supination to pronation of 45 to 52 degrees, or wherein the cut surface of the humerus is positioned centrally under the point of attack of the force, the humeroulnar joint is flexed from maximum extension by 10 to 12 degrees and in this position the forearm is rotated from maximum supination to pronation of 50 to 60 degrees, or wherein the cut surface of the humerus is positioned centrally under the point of attack of the force, the humeroulnar joint is flexed from maximum extension by 10 to 12 degrees and in this position the forearm is rotated from maximum supination to pronation of 60 to 70 degrees;
  b) defining a speed at which the defined mass impacts with the donor specimen when the holding mechanism is released is adjusted to 76 to 110 cm by means of the falling height of the defined mass,
  c) defining a compression to which the donor specimen is exposed upon impact of the defined mass when the holding mechanism is released is adjusted to 20 to 36 mm by means for adjusting the damping during the impact of the mass,
  d) defining a damping with which the defined mass is braked upon impact with the donor specimen when the holding mechanism is released is adjusted to 5 to 17 mm as the damped portion of the defined compression,
  e) releasing the holding mechanism, and
  f) removing the prepared specimen from the device.

2. The method of claim 1, wherein the distal radius fracture is a distal radius fracture extension of classification 23 A2, 23 C1-C3 (dorsal) according to AO, wherein a defined mass of 16.8 to 19.3 kg is adjusted, a defined speed is adjusted to 76 to 102 cm by means of the falling height of the defined mass, a defined compression is adjusted to 22 to 30 mm by means for adjusting the damping during the impact of the mass, a defined damping is adjusted to 6 to 14 mm as the damped portion of the defined compression; or distal radius fracture of classification 23 A2 (palmar) according to AO, wherein a defined mass of 16.8 to 20.5 kg is adjusted, a defined speed is adjusted to 82 to 105 cm by means of the falling height of the defined mass, a defined compression is adjusted to 25 to 35 mm by means for adjusting the damping during the impact of the mass, a defined damping is adjusted to 5 to 17 mm as the damped portion of the defined compression; or die-punch fracture of classification 23 C1-C2 according to AO, wherein a defined mass of 17 to 23.1 kg is adjusted, a defined speed is adjusted to 90 to 110 cm by means of the falling height of the defined mass, a defined compression is adjusted to 22 to 31 mm by means for adjusting the damping during the impact of the mass, a defined damping is adjusted to 9 to 15 mm as the damped portion of the defined compression; or distal radius fracture (chauffeur fracture) of classification 23 B1 according to AO, wherein a defined mass of 16.6 to 18.3 kg is adjusted, a defined speed is adjusted to 80 to 93 cm by means of the falling height of the defined mass, a defined compression is adjusted to 20 to 28 mm by means for adjusting the damping during the impact of the mass, a defined damping is adjusted to 6 to 14 mm as the damped portion of the defined compression; or distal radius fracture of classification 23 B3 according to AO, wherein a defined mass of 20 to 23 kg is adjusted, a defined speed is adjusted to 76 to 102 cm by means of the falling height of the defined mass, a defined compression is adjusted to 25 to 36 mm by means for adjusting the damping during the impact of the mass, a defined damping is adjusted to 10 to 16 mm as the damped portion of the defined compression.

3. The method of claim 1, wherein the means for securing the donor specimen comprises a polymer.

4. The method of claim 3, wherein the polymer is a cold-curing polymer.

5. The method of claim 3, wherein the donor specimen is secured within the device by severing the upper arm distally from the humerus head, removing soft tissue to expose the humerus head, potting the humerus head vertically in mold comprising the polymer, and after curing the polymer then connecting the cured polymer to the device with the clamping plate.

6. The method of claim 5, wherein the humerus head is placed centrally under the point of attack of the force generated by the step of releasing the holding mechanism.

* * * * *